US012323913B2

(12) United States Patent
Matsuda et al.

(10) Patent No.: US 12,323,913 B2
(45) Date of Patent: *Jun. 3, 2025

(54) COMMUNICATION APPARATUS, AND METHOD OF COMMUNICATION

(71) Applicant: SONY GROUP CORPORATION, Tokyo (JP)

(72) Inventors: Hiroki Matsuda, Tokyo (JP); Naoki Kusashima, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/157,258

(22) Filed: Jan. 20, 2023

(65) Prior Publication Data
US 2023/0156590 A1 May 18, 2023

Related U.S. Application Data

(63) Continuation of application No. 17/250,482, filed as application No. PCT/JP2019/027284 on Jul. 10, 2019, now Pat. No. 11,582,691.

(30) Foreign Application Priority Data

Aug. 3, 2018 (JP) ................................. 2018-147177

(51) Int. Cl.
*H04W 48/20* (2009.01)
*H04W 72/0453* (2023.01)
*H04W 74/0833* (2024.01)

(52) U.S. Cl.
CPC ....... *H04W 48/20* (2013.01); *H04W 72/0453* (2013.01); *H04W 74/0833* (2013.01)

(58) Field of Classification Search
CPC ............. H04W 48/20; H04W 72/0453; H04W 74/0833; H04W 72/29; H04W 48/16; H04W 48/12; H04W 84/06; H04W 88/06
See application file for complete search history.

(56) References Cited

U.S. PATENT DOCUMENTS 11,582,691 B2 * 2/2023 Matsuda ............... H04W 72/29
2006/0280200 A1 * 12/2006 Lane ................. H04W 56/0045
370/458

(Continued)

FOREIGN PATENT DOCUMENTS

| CN | 101243621 A | 8/2008 |
| CN | 101317342 A | 12/2008 |

(Continued)

OTHER PUBLICATIONS

"Study on New Radio (NR) to support non terrestrial networks (Release 15)", 3rd Generation Partnership Project, Technical Specification Group Radio Access Network, 3GPP TR 38.831 V1.0.0, Jun. 2018.

(Continued)

*Primary Examiner* — Kenneth T Lam
(74) *Attorney, Agent, or Firm* — CHIP LAW GROUP

(57) ABSTRACT

A communication apparatus includes an acquisition unit acquiring information from a base station apparatus, a determination unit determining whether a connected base station apparatus is a non-ground station or a ground station based on the acquired information, and a communication controller executing communication control for the non-ground station when it is determined that the connected base station apparatus is the non-ground station.

20 Claims, 13 Drawing Sheets

(56) References Cited

U.S. PATENT DOCUMENTS

| | | | |
|---|---|---|---|
| 2007/0123290 A1* | 5/2007 | Stenmark | H04W 52/0229 |
| | | | 455/343.1 |
| 2017/0118688 A1* | 4/2017 | Guvenc | H04W 36/20 |
| 2017/0230104 A1 | 8/2017 | Purkayastha et al. | |
| 2017/0245185 A1* | 8/2017 | Chuberre | H04B 7/15507 |
| 2020/0178137 A1* | 6/2020 | Hassan Hussein | |
| | | | H04B 7/18541 |
| 2020/0413451 A1* | 12/2020 | Taherzadeh Boroujeni | |
| | | | H04W 56/005 |
| 2021/0029658 A1* | 1/2021 | Mahalingam | H04W 56/0045 |
| 2021/0099893 A1* | 4/2021 | Suzuki | H04B 7/088 |

FOREIGN PATENT DOCUMENTS

| | | | |
|---|---|---|---|
| CN | 106575992 A | 4/2017 | |
| JP | 2006-109517 A | 4/2006 | |
| JP | 2008-544651 A | 12/2008 | |
| JP | 2009-517901 A | 4/2009 | |
| JP | 2014-175765 A | 9/2014 | |
| JP | 2015-192166 A | 11/2015 | |
| JP | 2017-011402 A | 1/2017 | |
| KR | 10-2008-0021784 A | 3/2008 | |
| KR | 10-2008-0080287 A | 9/2008 | |
| WO | 2006/138229 A2 | 12/2006 | |
| WO | 2007/060031 A1 | 5/2007 | |
| WO | WO-2014097707 A1 | 6/2014 | |
| WO | WO-2018068642 A1 | 4/2018 | |

OTHER PUBLICATIONS

International Search Report and Written Opinion of PCT Application No. PCT/JP2019/027284, issued on Sep. 3, 2019, 16 pages of English Translation and 11 pages of ISRWO.

International Preliminary Report on Patentability of PCT Application No. PCT/JP2019/027284, issued on Feb. 18, 2021, 16 pages of English Translation and 08 pages of IPRP.

Non-Final Office Action for U.S. Appl. No. 17/250,482, issued on May 24, 2022, 12 pages.

Notice of Allowance for U.S. Appl. No. 17/250,482, issued on Oct. 13, 2022, 08 pages.

* cited by examiner

COMMUNICATION APPARATUS, AND METHOD OF COMMUNICATION

CROSS REFERENCE TO RELATED APPLICATIONS

This application is a continuation application of U.S. patent application Ser. No. 17/250,482, filed on Jan. 26, 2021, is a U.S. National Phase of International Patent Application No. PCT/JP2019/027284 filed on Jul. 10, 2019, which claims priority benefit of Japanese Patent Application No. JP 2018-147177 filed in the Japan Patent Office on Aug. 3, 2018. Each of the above-referenced applications is hereby incorporated herein by reference in its entirety.

FIELD

The present disclosure relates to a communication apparatus, a method of communication, and a communication program and specifically relates to switching with respect to a base station such as a non-ground station or a ground station to which the communication apparatus is connected.

BACKGROUND

Mobile communication using radio access technologies such as cellular communication technologies is known. In such radio access technologies, along with movement of a communication apparatus such as a cellular phone, switching of a radio base station apparatus (hereinafter, referred to as a base station apparatus or a base station) to which the communication apparatus is connected is performed. For the base station, apart from a ground station installed on the ground, for example, a non-ground station up in the air such as an artificial satellite is being studied, for example. For the communication apparatus, apart from radio communication connected to the base station and via the base station, radio communication connected to the non-ground station and via the non-ground station is being studied.

CITATION LIST

Patent Literature

Non Patent Literature 1: PR-181393, "Study on New Radio (NR) to support non-terrestrial networks," 3GPP TSG RAN Meeting #80, La Jolla, CA, June, 2018.

SUMMARY

Technical Problem

For the communication apparatus, being studied is executing communication control according to the ground station or the non-ground station in accordance with whether a connected base station is the ground station or the non-ground station. However, the details of the communication control for the non-ground station are different from the details of the communication control for the ground station in accordance with the features of the non-ground station. Thus, it is assumed that the communication apparatus, if making a mistake in the setting of the communication control for the connected base station, cannot establish radio communication with the connected base station.

Given these circumstances, the present disclosure proposes a communication apparatus, a method of communication, and a communication program that can execute communication control in accordance with the connected base station.

Solution to Problem

To solve the above problems, a communication apparatus according to the present disclosure includes: an acquisition unit acquiring information from a base station apparatus; a determination unit determining whether a connected base station apparatus is a non-ground station or a ground station based on the acquired information; and a communication controller executing communication control for the non-ground station when it is determined that the connected base station apparatus is the non-ground station.

(Action)

In the communication apparatus of an embodiment according to the present disclosure, the acquisition unit acquires the information from the base station apparatus. The determination unit determines whether the connected base station apparatus is the non-ground station or the ground station based on the acquired information. When it is determined that the connected base station apparatus is the non-ground station, the communication controller executes the communication control for the non-ground station, and thus the communication control corresponding to the connected base station can be executed.

Advantageous Effects of Invention

The present disclosure can execute communication control in accordance with a connected base station. The effect described herein is not necessarily limiting and may be any effect described in the present disclosure.

DESCRIPTION OF EMBODIMENTS

Figure 1:
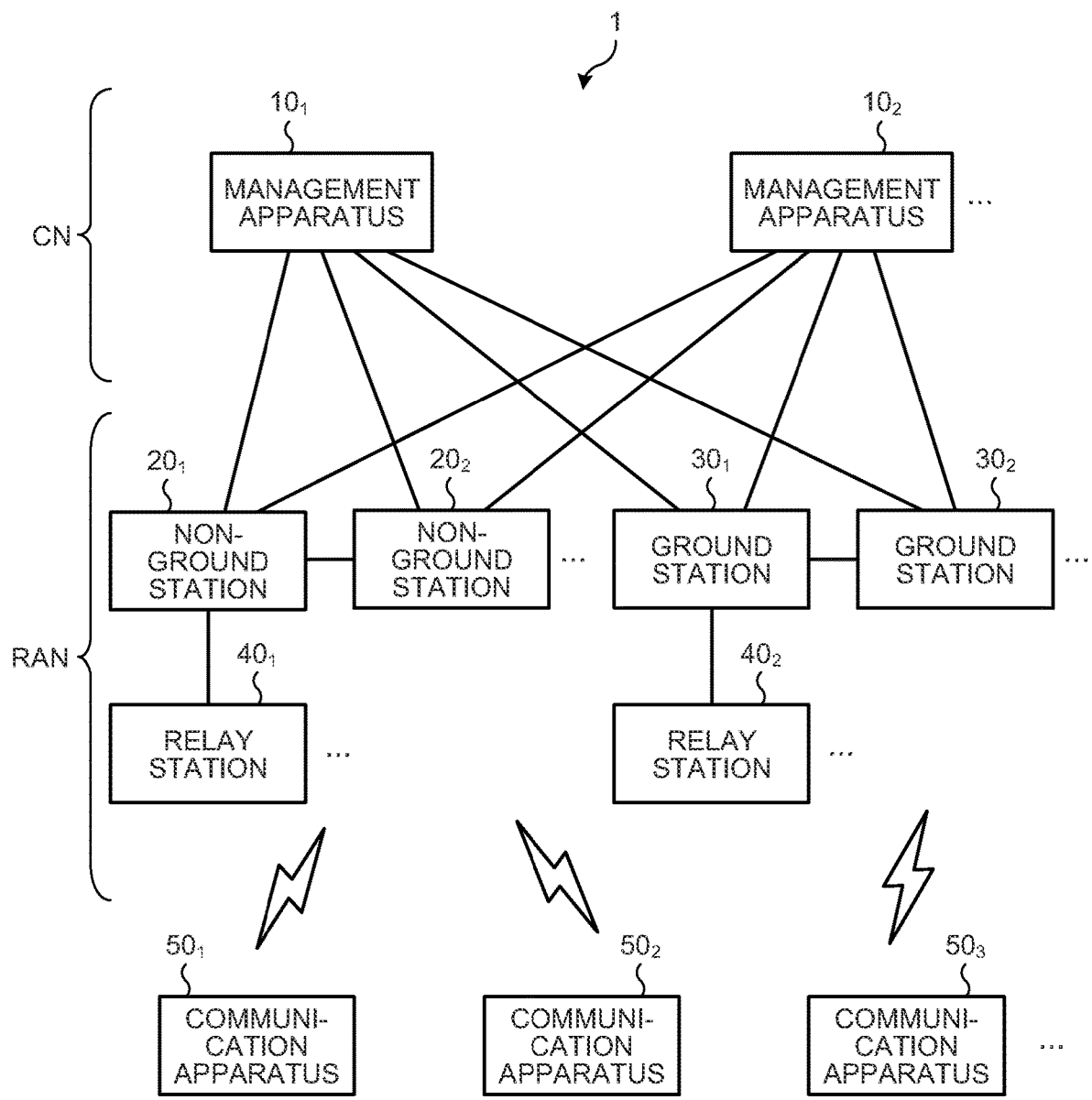
FIG. 1 is a diagram of a configuration example of a communication system according to an embodiment of the present disclosure.

The following describes an embodiment of the present disclosure in detail based on the accompanying drawings. In the following embodiments, the same parts are denoted by the same symbols, thereby omitting a duplicate description.

In the present specification and drawings, a plurality of components having substantially the same functional configuration may be distinguished from each other by adding different figures to the same symbol from behind. The components having substantially the same functional configuration are distinguished from each other as in communication apparatuses 501, 502, and 503 as needed, for example. However, when there is no need to especially distinguish the components having substantially the same functional configuration from each other, they are denoted only by the same symbol. When there is no need to especially distinguish the communication apparatuses 501, 502, and 503 from each other, they are referred to simply as a communication apparatus 50, for example.

The following describes the present disclosure in accordance with the following item order.

1. Introduction
2. Embodiment
2-1. Entire Configuration of Communication System
2-2. Configuration of Management Apparatus
2-3. Configuration of Base Station
2-4. Configuration of Relay Station
2-5. Configuration of Communication Apparatus
2-6. Initial Connection Processing
2-7. Random Access Procedure
2-8. Necessity of Switching Processing
2-9. Functional Configuration of Communication Apparatus
2-10. Switching Processing
2-11. Effects
3. Modifications
3-1. Modifications about System Configuration
3-2. Other Modifications
4. Conclusion

1. INTRODUCTION

Radio access technologies such as Long Term Evolution (LTE) and New Radio (NR) are being studied in 3rd Generation Partnership Project (3GPP). LTE and NR are each a kind of cellular communication technologies and enable mobile communication by terminal apparatuses by arranging a plurality of areas covered by base stations in a cell form. In the following description, "LTE" includes LTE-Advanced (LTE-A), LTE-Advanced Pro (LTE-A Pro), and Evolved Universal Terrestrial Radio Access (EUTRA). NR includes New Radio Access Technology (NRAT) and Further EUTRA (FEUTRA).

NR is a radio access technology (RAT) of the next generation of LTE (the 5th generation). NR is a radio access technology ready for various use cases including Enhanced Mobile Broadband (eMBB), Massive Machine Type Communications (mMTC), and Ultra-Reliable and Low Latency Communications (URLLC). NR is being studied aiming at a technical framework ready for use scenarios, required conditions, layout scenarios, and the like in these use cases.

Furthermore, in NR, owing to increasing demand for wide-area coverage, connection stability, and the like, a non-terrestrial network (NTN) has started to be studied. In the non-terrestrial network, it is expected that terminal apparatuses will be provided with a radio network via a base station other than a ground station such as a satellite station or an aircraft station. This base station other than the ground station is referred to as a non-ground station or a non-ground base station. A radio network provided by the ground station is referred to as a terrestrial network (TN). The terrestrial network and the non-terrestrial network have the same radio access system, whereby integral operation of the terrestrial network and the non-terrestrial network is enabled.

In the embodiment of the present disclosure, the ground station (also referred to as a ground base station) refers to a base station installed on the ground (including a relay station). The "ground" is ground in a broad sense including not only ground (land) but also underground, water-borne, and underwater.

2. EMBODIMENT

The following describes a communication system 1 according to the present embodiment. The communication system 1 includes non-ground stations and provides radio communication using the non-terrestrial network to communication apparatuses. The non-terrestrial network included in the communication system 1 is not limited to a radio network using a radio access system prescribed in NR. The non-terrestrial network included in the communication system 1 may be a radio network of a radio access system other than NR such as LTE, Wideband Code Division Multiple Access (W-CDMA) or Code Division Multiple Access 2000) cdma2000.

In the following description, the concept of the base station (hereinafter, also referred to as a base station apparatus) includes the relay station (hereinafter, also referred to as a relay apparatus). The concept of the base station includes not only a structure including the function of the base station but also an apparatus installed in the structure. Examples of the structure include buildings such as high-rise buildings, houses, steel towers, station facilities, airport facilities, port facilities, and stadiums. The concept of the structure includes not only buildings but also non-building structures such as tunnels, bridges, dams, fences, and steel poles and equipment such as cranes, gates, and windmills. The concept of the structure includes not only ground (land) or underground structures but also water-borne structures such as piers and megafloats and underwater structures such as marine observation facilities.

The base station may be a base station configured to be movable. The base station may be an apparatus installed in a mobile body or the mobile body itself, for example. The mobile body may be a mobile terminal such a s a smartphone, a mobile body moving on the ground (land) (a vehicle such as an automobile, a bus, a truck, a train, or a linear motor car), or a mobile body moving underground (in a tunnel, for example) (a subway, for example). The mobile body may be a mobile body moving on the water (a ship such as a passenger ship, a freight vessel, or a hovercraft) or a mobile body moving underground (a submersible vessel such as a submersible, a submarine, or an unmanned diving machine). The mobile body may be a mobile body moving in the atmosphere (aircraft such as an airplane, an airship, or a drone) or a space mobile body moving outside the atmosphere (an artificial celestial body such as an artificial satellite, a spaceship, a space station, or a probe).

The base station of LTE may be referred to as Evolved Node B (eNodeB) or eNB. The base station of NR may be referred to as gNodeB or gNB. In LTE and NR, the terminal apparatus (also referred to as a mobile station, a mobile station apparatus, or a terminal) may be referred to as user equipment (UE). The terminal apparatus is a kind of the communication apparatus and is also referred to as a mobile station, a mobile station apparatus, or a terminal. In the embodiment of the present disclosure, the concept of the communication apparatus includes not only a portable terminal apparatus such as a portable terminal but also an apparatus installed in the structure or the mobile body, for example. The concept of the communication apparatus includes not only the terminal apparatus but also the base station and the relay station.

[2-1. Entire Configuration of Communication System]

FIG. 1 is a diagram of a configuration example of the communication system 1 according to the embodiment of the present disclosure. The communication system 1 includes a management apparatus 10, a non-ground base station (hereinafter, referred to simply as a non-ground station) 20, a ground base station (hereinafter, referred to simply as a ground station) 30, a relay apparatus (hereinafter, referred to simply as a relay station) 40, and the communication apparatus 50. The communication system 1 causes radio communication apparatuses forming the communication system 1 to operate in corporation with each other to provide a user with a mobile communication-enabled radio network. The radio communication apparatuses refer to apparatuses having a radio communication function; in the example in FIG. 1, the non-ground station 20, the ground station 30, the relay station 40, and the communication apparatus 50 fall under the apparatuses.

The communication system 1 may include a plurality of each of management apparatuses 10, non-ground stations 20, ground stations 30, relay stations 40, and communication apparatuses 50. In the example in FIG. 1, the communication system 1 includes management apparatuses 101 and 102 and the like as the management apparatus 10. The communication system 1 includes non-ground stations 201 and 202 and the like as the non-ground station 20 and includes ground stations 301 and 302 and the like as the ground station 30. The communication system 1 includes relay stations 401 and 402 and the like as the relay station 40 and includes communication apparatuses 501, 502, and 503 and the like as the communication apparatus 50.

The management apparatus 10 is an apparatus managing the radio network. The management apparatus 10 is an apparatus functioning as Mobility Management Entity (MME) or Access and Mobility Management Function (AMF), for example. The management apparatus 10 forms a core network CN. The core network CN is Evolved Packet Core (EPC) or 5G Core Network (5GC), for example. The management apparatus 10 is connected to each of a plurality of non-ground stations 20 and a plurality of ground stations 30. The management apparatus 10 manages the communication of the non-ground stations 20 and the ground stations 30.

The non-ground station 20 is a base station performing radio communication with the communication apparatus 50. In the example in FIG. 1, the non-ground station 201 is connected to the relay station 401 and can also perform radio communication with the communication apparatus 50 via the relay station 401. In the present embodiment, the non-ground station 20 is a base station that can float in the air or space. The non-ground station 20 is a non-ground station apparatus such as an aircraft station or a satellite station, for example.

The aircraft station is a radio communication apparatus that can float in the atmosphere such as an aircraft. The aircraft station may be an apparatus installed in an aircraft or the like or the aircraft itself, for example. The concept of the aircraft includes not only a heavy aircraft such as an airplane or a glider but also a light aircraft such as a balloon or an airship. The concept of the aircraft includes not only the heavy aircraft and the light aircraft but also a rotary wing aircraft such as a helicopter or an autogyro. The aircraft station (or an aircraft in which the aircraft station is installed) may be an unmanned aircraft such as a drone. The concept of the unmanned aircraft also includes unmanned aircraft systems (UAS) and tethered UAS. The concept of the unmanned aircraft includes lighter than air (LTA) UAS and heavier than air (HTA) UAS. In addition, the concept of the unmanned aircraft also includes high altitude UAS platforms (HAPs).

The satellite station is a radio communication apparatus that can float in outer space. The satellite station may be an apparatus installed in a space mobile body such as an artificial satellite or the space mobile body itself. A satellite to be the satellite station may be any of a low earth orbiting (LEO) satellite, a medium earth orbiting (MEO) satellite, a geostationary earth orbiting (GEO) satellite, and a highly elliptical orbiting (HEO) satellite. It is understood that the satellite station may be an apparatus installed in the low earth orbiting satellite, the medium earth orbiting satellite, the geostationary earth orbiting satellite, or the highly elliptical orbiting satellite.

The ground station 30 is a base station performing radio communication with the communication apparatus 50. In the example in FIG. 1, the ground station 301 is connected to the relay station 402 and can also perform radio communication with the communication apparatus 50 via the relay station 402. The ground station 30 may be a base station placed in the structure on the ground or a base station installed in the mobile body moving on the ground. The ground station 30 is an antenna installed in the structure such as a building and a signal processing apparatus connected to the antenna, for example. It is understood that the ground station 30 may be the structure or the mobile body itself.

The relay station 40 is an apparatus serving as a relay apparatus of the base station. The relay station 40 is a kind of the base station. The relay station 40 relays the communication between the non-ground station 20 and the communication apparatus 50 or the communication between the ground station 30 and the communication apparatus 50. The relay station 40 may be the ground station or the non-ground station. The relay station 40 forms a radio access network RAN together with the non-ground station 20 and the ground station 30.

The communication apparatus 50 is a cellular phone, a smart device (a smartphone or a tablet), a personal digital assistant (PDA), or a personal computer, for example. The communication apparatus 50 may be a Machine to Machine (M2M) device or an Internet of Things (IoT) device. The communication apparatus 50 may be a radio communication apparatus installed in the mobile body or the mobile body itself. The communication apparatus 50 may be a relay station relaying satellite communication or a base station receiving satellite communication. The communication apparatus 50 is ready for both the terrestrial network and the non-terrestrial network. Thus, the communication apparatus 50 can communicate with not only a ground station apparatus such as the ground station 30 but also a non-ground station apparatus such as the non-ground station 20.

Figure 2:
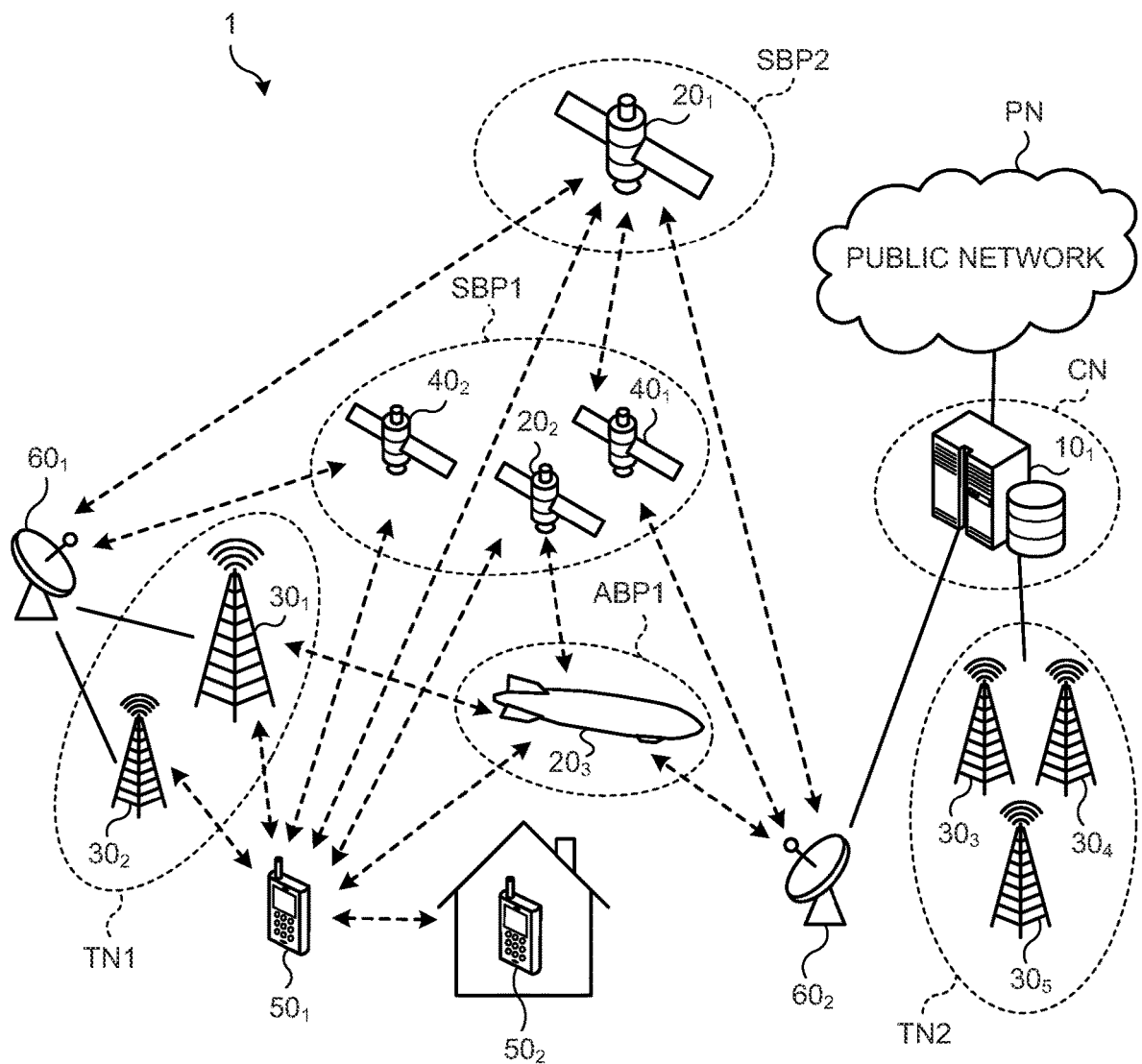
FIG. 2 is a diagram of an exemplary radio network provided by the communication system.

FIG. 2 is a diagram of an exemplary radio network provided by the communication system 1. The non-ground station 20 and the ground station 30 each form a cell. The cell is an area in which radio communication is covered by the base station. The cell formed by the non-ground station 20 and the ground station 30 may be any of a macro cell, a micro cell, a femto cell, and a small cell. The communication system 1 may be formed so as to manage a plurality of cells by a single base station or be formed so as to manage one cell by a plurality of base stations.

In the example in FIG. 2, the ground stations 301 and 302 form a terrestrial network TN1, whereas ground stations 303, 304, and 305 form a terrestrial network TN2. The terrestrial network TN1 and the terrestrial network TN2 are each a terrestrial network run by a radio communication provider such as a telephone company, for example. The terrestrial network TN1 and the terrestrial network TN2 may be run by different radio communication providers or be run by the same radio communication provider. The terrestrial network TN1 and the terrestrial network TN2 can also be regarded as one terrestrial network.

The terrestrial network TN1 and the terrestrial network TN2 are each connected to a core network. In the example in FIG. 2, the ground station 30 forming the terrestrial network TN2 is connected to the core network CN including the management apparatus 101. When the radio access system of the terrestrial network TN2 is LTE, the core network CN is EPC. When the radio access system of the terrestrial network TN2 is NR, the core network CN is 5GC. It is understood that the core network CN is not limited to EPC or 5GC and may be a core network of another radio access system. In the example in FIG. 2, the terrestrial network TN1 is not connected to any core network, but the terrestrial network TN1 may be connected to the core network CN. The terrestrial network TN1 may be connected to a core network (not illustrated) different from the core network CN.

The core network CN includes a gateway apparatus or a gateway exchange and is connected to a public network PN via the gateway apparatus. The public network PN is a public data network such as the Internet, a local IP network, or a telephone network (a cellular phone network, a fixed-line telephone network, or the like), for example. The gateway apparatus is a server apparatus connected to the Internet, a local IP network, or the like, for example. The gateway exchange is an exchange connected to a telephone network of a telephone company, for example. The management apparatus 101 may have functions as the gateway apparatus and the gateway exchange.

The non-ground station 20 and the relay station 40 illustrated in FIG. 2 are each a non-ground station apparatus such as a satellite station or an aircraft station. A satellite station group (or a single satellite station) forming the non-terrestrial network is referred to as a spaceborne platform. An aircraft station group (or a single aircraft station) forming the non-terrestrial network is referred to as an airborne platform. In the example in FIG. 2, the non-ground station 20$_2$, the relay station 40$_1$, and the relay station 40$_2$ form a spaceborne platform SBP1, whereas the non-ground station 20$_1$ forms a spaceborne platform SBP2. A non-ground station 20$_3$ forms an airborne platform ABP1.

The communication apparatus 50 can communicate with both the ground station 30 and the non-ground station 20. In the example in FIG. 2, the communication apparatus 50$_1$ can communicate with the ground station 30 forming the terrestrial network TN1. The communication apparatus 50$_1$ can communicate with the non-ground station 20 forming the spaceborne platforms SBP1 and SBP2. The communication apparatus 50$_1$ can also communicate with the non-ground station 20 forming the airborne platform ABP1. The communication apparatus 50$_1$ may be able to directly communicate with another communication apparatus 50 (the communication apparatus 50$_2$ in the example in FIG. 2).

The non-ground station 20 connects to the terrestrial network or the core network via a relay station 60. The non-ground station 20 forming the spaceborne platforms SBP1 and SBP2 connects to the terrestrial network TN1 via a relay station 60$_1$. The non-ground station 20 forming the spaceborne platforms SBP1 and SBP2 and the airborne platform ABP1 connects to the core network CN via a relay station 60$_2$. The non-ground station 20 can also directly communicate with the non-ground station 20 without involving the relay station 60.

The relay station 60 is an air station or an earth station, for example. The air station is a radio station installed on the ground or the mobile body moving on the ground in order to performing communication with the aircraft station. The earth station is a radio station positioned on the earth (including in the air) in order to communicate with the satellite station (a space station). The earth station may be a large-sized earth station or a small-sized earth station such as a very small aperture terminal (VSAT). The earth station may be a VSAT control earth station (also referred to as a master station or a HUB station) or a VSAT earth station (also referred to as a slave station). The earth station may be a radio station installed in the mobile body moving on the ground. Examples of the earth station installed in ships include earth stations on board vessels (ESV). The earth station may include an aircraft earth station, which is installed in an aircraft (including a helicopter) to communicate with the satellite station. The earth station may include an air earth station, which is installed in the mobile body moving on the ground to communicate with the aircraft earth station via the satellite station. The relay station 60 may be a portable radio station communicating with the satellite station or the aircraft station. The relay station 60 can be regarded as part of the communication system 1.

Figure 3:
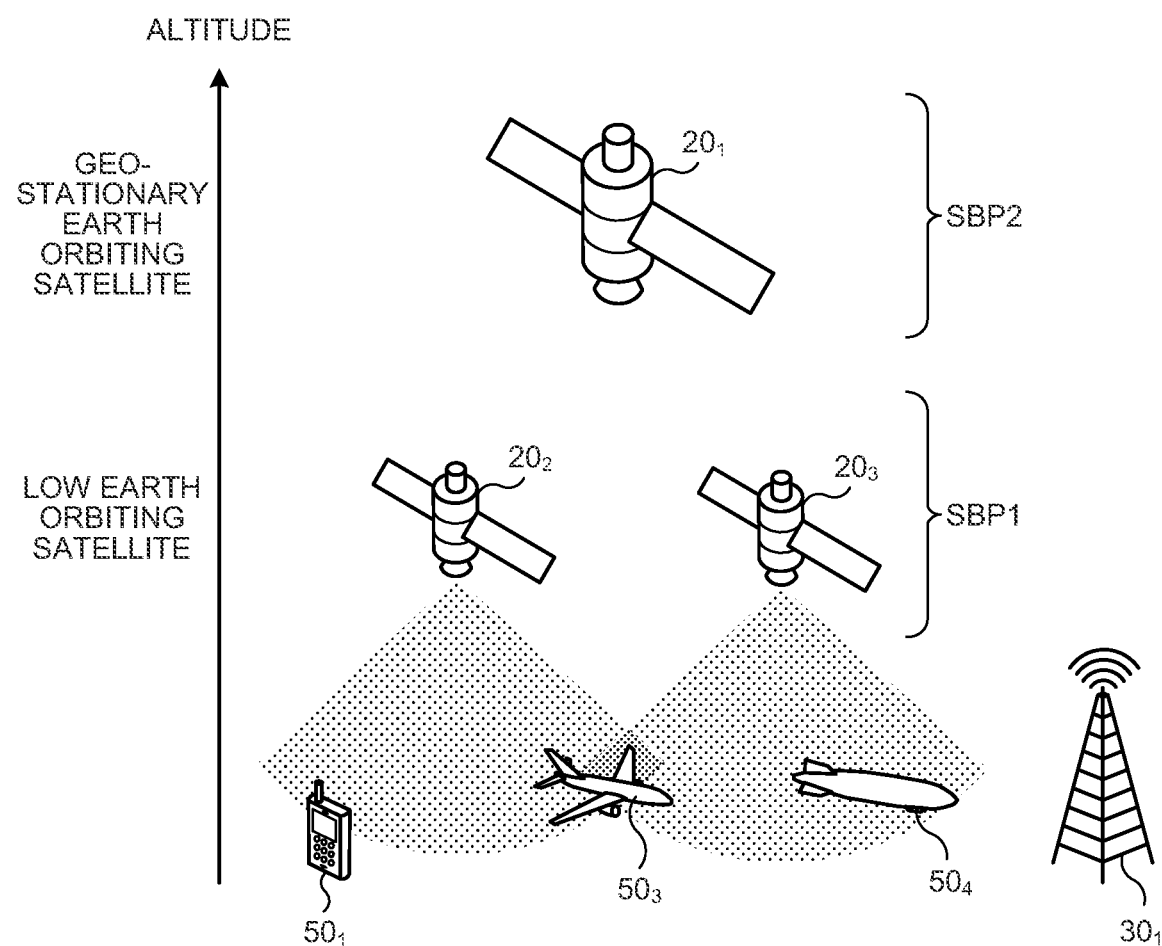
FIG. 3 is a diagram of an outline of satellite communication provided by the communication system.

The apparatuses forming the spaceborne platforms SBP1 and SBP2 perform satellite communication with the communication apparatus 50. The satellite communication refers to radio communication between the satellite station and the communication apparatus 50. FIG. 3 is a diagram of an outline of the satellite communication provided by the communication system 1. The satellite station is mainly divided into a geostationary earth orbiting satellite station and a low earth orbiting satellite station.

The geostationary earth orbiting satellite station is positioned at an altitude of about 35,786 kilometers and revolves around the earth at the same speed as the rotational speed of the earth. In the example in FIG. 3, the non-ground station 201 forming the spaceborne platform SBP2 is the geostationary earth orbiting satellite station. The geostationary earth orbiting satellite station has a relative speed with the communication apparatus 50 on the ground of substantially zero and is observed as if it is stationary from the communication apparatus 50 on the ground. The non-ground station 201 performs the satellite communication with the communication apparatuses 501, 503, and 504 and the like positioned on the earth.

The low earth orbiting satellite station is a satellite station circling at a lower altitude than that of the geostationary earth orbiting satellite station and a medium earth orbiting satellite station. The low earth orbiting satellite station is a satellite station positioned at an altitude of between 500 kilometers and 2,000 kilometers, for example. In the example in FIG. 3, the non-ground stations 202 and 203 forming the spaceborne platform SBP1 are the low earth orbiting satellite stations. FIG. 3 illustrates only two non-ground stations 202 and 203 as the satellite stations forming the spaceborne platform SBP1; however, actually, the satellite stations forming the spaceborne platform SBP1 form a low earth orbiting satellite constellation with two or more (a few tens of to a few thousand, for example) non-ground stations 20. The low earth orbiting satellite station, unlike the geostationary earth orbiting satellite station, has a relative speed with the communication apparatus 50 on the ground and is observed as if it is moving from the communication apparatus 50 on the ground. The non-ground stations 202 and 203 each form a cell to perform the satellite communication with the communication apparatuses 501, 502, and 503 and the like positioned on the ground.

Figure 4:
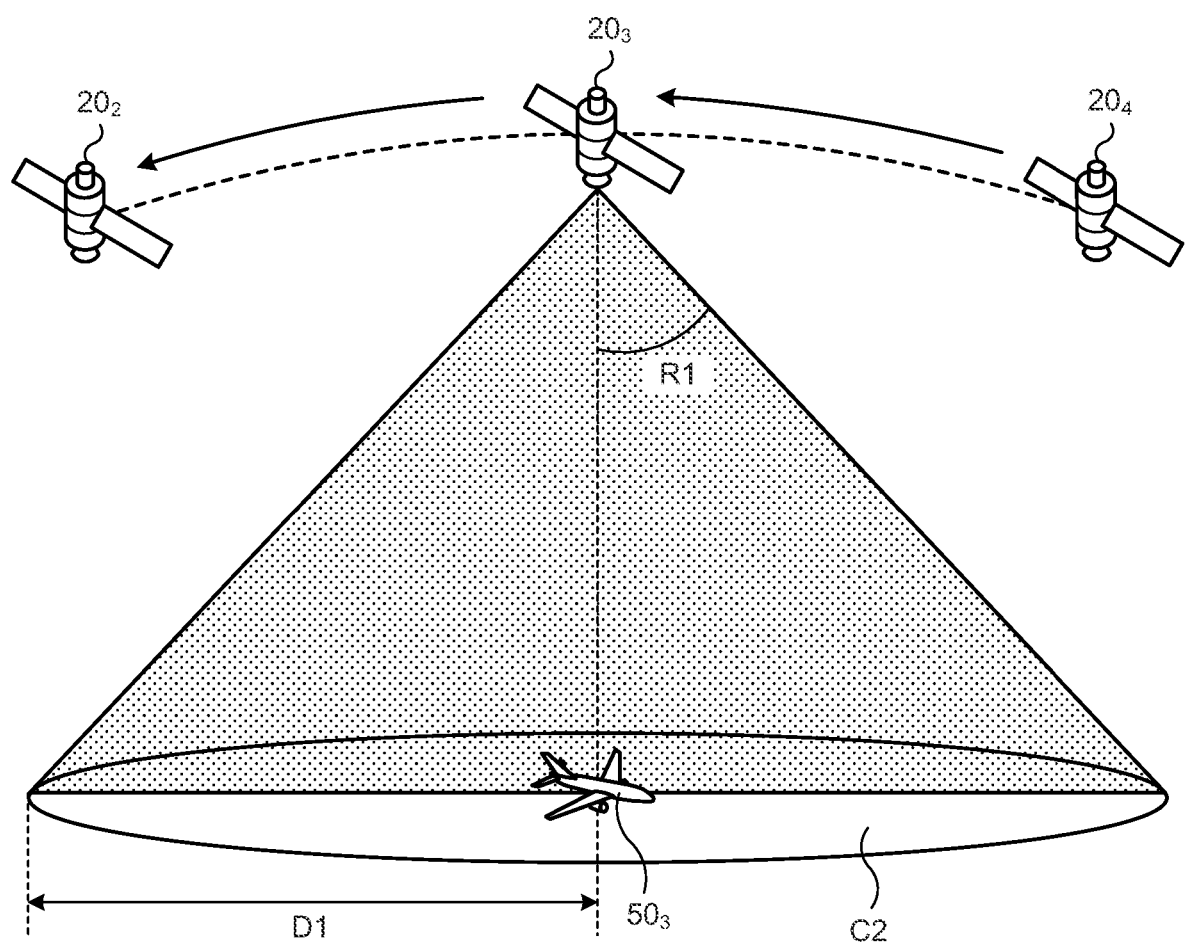
FIG. 4 is a diagram of an exemplary cell formed by a satellite station.

FIG. 4 is a diagram of an exemplary cell formed by the satellite station. FIG. 4 illustrates a cell C2 formed by the non-ground station 203 as the low earth orbiting satellite station. The satellite station circling on a low earth orbit has certain directivity with the ground to communicate with the communication apparatus 50 on the ground. The angle R1 illustrated in FIG. 4 is 40 degrees, for example. In the case of FIG. 4, the radius D1 of the cell C2 formed by the non-ground station 203 is 1,000 kilometers, for example. The low earth orbiting satellite station moves at a constant speed. When it has become difficult for the low earth orbiting satellite station to provide the satellite communication to the communication apparatus 50 on the ground, a subsequent low earth orbiting satellite station provides the satellite communication. In the example in FIG. 4, when it has become difficult for the non-ground station 203 to provide the satellite communication to the communication apparatus 50 on the ground, the subsequent non-ground station 204 provides the satellite communication. The values of the angle R1 and the radius D1 described above are only by way of example and are not limiting.

As described above, the communication apparatus 50 enables radio communication using the non-terrestrial network. The non-ground station 20 and the relay station 40 of the communication system 1 form the non-terrestrial network. Thus, the communication system 1 can expand a service to the communication apparatus 50 positioned in an area that cannot be covered by the terrestrial network. The communication system 1 can provide the communication apparatus 50 such as an Internet of Things (IoT) device or a Machine Type Communications (MTC) device with public safety communication or critical communication, for example. By using the non-terrestrial network, service reliability and recoverability increase, and thus the communication system 1 can reduce service vulnerability to physical attacks or natural disasters. The communication system 1 can achieve service connection to airplane's passengers or aircraft terminal apparatuses such as drones and service connection to mobile body terminal apparatuses such as ships and trains. In addition, the communication system 1 can achieve provision of A/V content, group communication, an IoT broadcast service, a software download service, a high-efficiency multicast service such as urgent messages, a high-efficiency broadcast service, and the like. Furthermore, the communication system 1 can also achieve traffic offload between the terrestrial network and the non-terrestrial network. For these to be achieved, the non-terrestrial network provided by the communication system 1 is desirably operation-integrated with the terrestrial network provided by the communication system 1 in a higher layer. The non-terrestrial network provided by the communication system 1 desirably has a radio access system common to that of the terrestrial network provided by the communication system 1.

In communication using the non-terrestrial network also, like communication using the terrestrial network, connection to the connected base station from the idle state and switching of the connected base station such as handover from the non-ground station 20 to another non-ground station 20 occur, for example. However, in the communication using the non-terrestrial network, the distance between the communication apparatus 50 and the base station may be longer depending on the mode of the base station. Thus, in the communication using the non-terrestrial network, a signal transmission delay may be larger depending on the mode of the base station. Transmission from the non-ground station 20 to the communication apparatus 50 has a larger transmission delay than that of transmission from the ground station 30 to the communication apparatus 50, for example. Moreover, the ground station 30 and the non-ground station 20 have different cell features.

It is assumed that the non-ground station 20 has a higher relative moving speed with respect to the communication apparatus 50 depending on the type of the artificial satellite or the like, for example. When the moving speed of the communication apparatus 50 itself becomes higher, the relative moving speed of the non-ground station 20 with respect to the communication apparatus 50 may be higher. A higher relative moving speed has an influence on selection of a cell by the communication apparatus 50.

As described above, it is assumed that the non-ground station 20 has a higher relative moving speed with respect to the communication apparatus 50 depending on the type thereof. Thus, in the communication using the non-terrestrial network, switching of the base station may occur more frequently than in the communication using the terrestrial network. When the non-terrestrial network includes the low earth orbiting satellite constellation including a few hundred to a few thousand low earth orbiting satellites, for example, switching of the base station to which the communication apparatus 50 connects may repeatedly occur in a short time regardless of the presence or absence of movement of the communication apparatus 50, which has an influence on selection of a cell by the communication apparatus 50.

In the communication using the terrestrial network also, the relative speed between the ground station 30 and the communication apparatus 50 may be higher depending on the mode of the ground station 30 and the communication apparatus 50. When either one or both of the ground station 30 and the communication apparatus 50 are positioned within the mobile body moving at a high speed, for example, the relative speed between the ground station 30 and the communication apparatus 50 is higher. In this case also, switching of the base station to which the communication apparatus 50 connects may repeatedly occur in a short time, which has an influence on selection of a cell by the communication apparatus 50.

When the possibility of a failure of base station switching processing increases, or when switching of the connected base station frequently occurs, communication quality may degrade. It takes time to acquire data, packet loss occurs, seamless communication cannot be achieved, or large fluctuations in communication speed occur, for example.

Thus, if being unable to determine whether the connected base station is the ground station 30 or the non-ground station 20, the communication apparatus 50 fails in radio communication with the connected base station. Even if being able to determine that the connected base station is the non-ground station 20, the communication apparatus 50 cannot set communication control for the non-ground station 20 and fails in radio communication with the non-ground station 20.

Given these circumstances, in the present embodiment, the communication apparatus 50 determines whether the connected base station is the ground station 30 or the non-ground station 20 to achieve the communication control corresponding to the connected base station. Specifically, the communication apparatus 50 acquires information from the connected base station and determines whether the connected base station is the non-ground station 20 or the ground station 30 based on the acquired information. The information to be acquired is information such as a radio communication band, a synchronization signal, system information, or a cell ID, which is different between the ground station 30 and the non-ground station 20. When it is determined that the connected base station is the non-ground station 20, the communication apparatus 50 executes the communication control for the non-ground station 20. Consequently, the communication apparatus 50 can achieve the communication control according to the connected base station.

The following specifically describes configurations of the respective apparatuses forming the communication system 1 according to the present embodiment.

[2-2. Configuration of Management Apparatus]

The management apparatus 10 is an apparatus managing the radio network. The management apparatus 10 is an apparatus managing the communication of the non-ground station 20 and the ground station 30, for example. When the core network is EPC, the management apparatus 10 is an apparatus having a function as Mobility Management Entity (MME), for example. When the core network is 5GC, the management apparatus 10 is an apparatus having a function as Access and Mobility Management Function (AMF), for example. The management apparatus 10 may have the function of a gateway. When the core network is EPC, for example, the management apparatus 10 may have a function as Serving Gateway (S-GW) or Packet Data Network Gateway (P-GW). When the core network is 5GC, the management apparatus 10 may have a function as User Plane Function (UPF). The management apparatus 10 is not necessarily required to be an apparatus forming the core network. When the core network is the core network of W-CDMA or cdma2000, for example, the management apparatus 10 may be an apparatus functioning as a Radio Network Controller (RNC).

Figure 5:
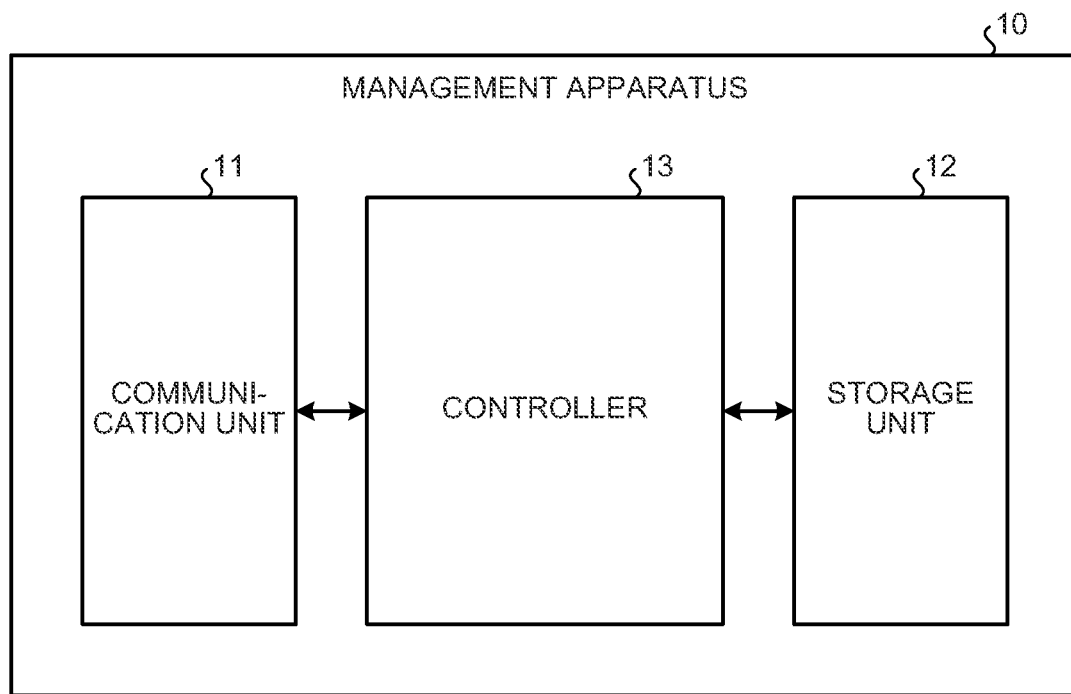
FIG. 5 is a diagram of a configuration example of a management apparatus according to the embodiment of the present disclosure.

FIG. 5 is a diagram of a configuration example of the management apparatus 10 according to the embodiment of the present disclosure. The management apparatus 10 includes a communication unit 11, a storage unit 12, and a controller 13. The configuration illustrated in FIG. 5 is a functional configuration, and a hardware configuration may be different from this example. The function of the management apparatus 10 may be implemented by being distributed to a plurality of physically separated structures. The management apparatus 10 may be formed by a plurality of server apparatuses, for example.

The communication unit 11 is a communication interface for communicating with another apparatus. The communication unit 11 may be a network interface or a device connection interface. The communication unit 11 may be Local Area Network (LAN) interface such as Network Interface Card (NIC) or a Universal Serial Bus (USB) interface including a USB host controller or a USB port, for example. The communication unit 11 may be a wired interface or a wireless interface. The communication unit 11 functions as communication means of the management apparatus 10. The communication unit 11 communicates with the ground station 30 and the relay station 60 in accordance with control of the controller 13.

The storage unit 12 is a data-readable/writable storage apparatus such as a dynamic random access memory (DRAM), a static random access memory (SRAM), a flash memory, or a hard disk. The storage unit 12 functions as storage means of the management apparatus 10. The storage unit 12 stores therein a connection state of the communication apparatus 50, for example. The storage unit 12 stores therein the state of Radio Resource Control (RRC) and the state of EPS Connection Management (ECM) of the communication apparatus 50, for example. The storage unit 12 may function as a home memory storing therein position information of the communication apparatus 50.

The controller 13 is a controller controlling the units of the management apparatus 10. The controller 13 is implemented by a processor such as a central processing unit (CPU) or a micro processing unit (MPU), for example. The controller 13 is implemented by executing various kinds of computer programs stored in the storage apparatus within the management apparatus 10 by the processor with a random access memory (RAM) or the like as a working area, for example. The controller 13 may be implemented by an integrated circuit such as an application specific integrated circuit (ASIC) or a field programmable gate array (FPGA). The CPU, the MPU, the ASIC, and the FPGA can all be regarded as the controller.

[2-3. Configuration of Base Station]

The following describes a configuration of the base station. The communication system 1 includes the non-ground station 20 forming the non-terrestrial network and the ground station 30 forming the terrestrial network as the base station. Any of the non-ground station 20 forming the non-terrestrial network can move. The following first describes a configuration of the non-ground station 20.

[Non-Ground Station]

Figure 6:
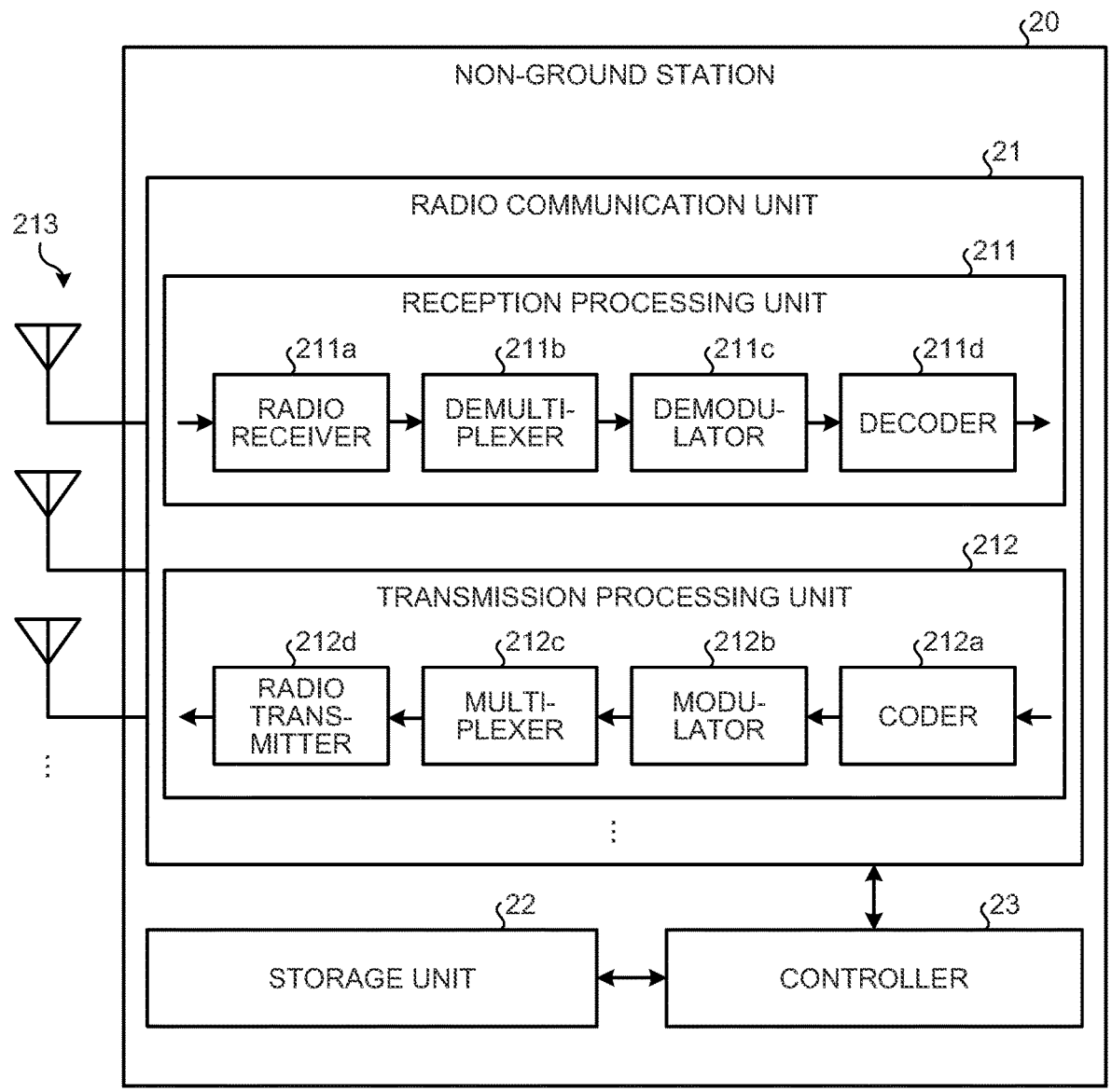
FIG. 6 is a diagram of a configuration example of a non-ground station according to the embodiment of the present disclosure.

FIG. 6 is a diagram of a configuration example of the non-ground station 20 according to the embodiment of the present disclosure. The non-ground station 20 includes a radio communication unit 21, a storage unit 22, and a controller 23. The configuration illustrated in FIG. 6 is a functional configuration, and a hardware configuration may be different from this example. The function of the non-ground station 20 may be implemented by being distributed to a plurality of physically separated structures.

The radio communication unit 21 is a radio communication interface performing radio communication with another radio communication apparatus (the communication apparatus 50 or the relay station 60, for example). The radio communication unit 21 is ready for one or a plurality of radio access systems. The radio communication unit 21 is ready for both NR and LTE, for example. The radio communication unit 21 may be ready for W-CDMA and cdma2000 in addition to NR and LTE. The radio communication unit 21 includes a reception processing unit 211, a transmission processing unit 212, and an antenna 213. The radio communication unit 21 may include a plurality of each of reception processing units 211, transmission processing units 212, and antennas 213. When the radio communication unit 21 is ready for the radio access systems, the units of the radio communication unit 21 can be configured separately for each of the radio access systems. The reception processing unit 211 and the transmission processing unit 212 may be configured separately for LTE and NR, for example.

The reception processing unit 211 performs processing on an uplink signal received via the antenna 213. The reception processing unit 211 includes a radio receiver 211a, a demultiplexer 211b, a demodulator 211c, and a decoder 211d.

The radio receiver 211a performs down conversion, removal of unnecessary frequency components, control of an amplification level, quadrature demodulation, conversion to a digital signal, removal of a guard interval, extraction of a frequency domain signal by fast Fourier transform, and the like on the unlink signal. The demultiplexer 211b separates an uplink channel such as a physical uplink shared channel (PUSCH) or a physical uplink control channel (PUCCH) and an uplink reference signal from a signal output from the radio receiver 211a. The demodulator 211c performs reception signal demodulation on a modulation symbol of the uplink channel using a modulation system such as binary phase shift keying (BPSK) or quadrature phase shift keying (QPSK). The modulation system used by the demodulator 211c may be 16 quadrature amplitude modulation (QAM), 64QAM, 256QAM, or the like. The decoder 211d performs decoding processing on coded bits of the demodulated uplink channel. The decoded uplink data and uplink control information are output to the controller 23.

The transmission processing unit 212 performs processing to transmit downlink control information and downlink data. The transmission processing unit 212 includes a coder 212a, a modulator 212b, a multiplexer 212c, and a radio transmitter 212d.

The coder 212a performs coding on the downlink control information and the downlink data input from the controller 23 using a coding system such as block coding, convoluting coding, or turbo coding. The modulator 212b modulates coded bits output from the coder 212a by a certain modulation system such as BPSK, QPSK, 16QAM, 64QAM, or 256QAM. The multiplexer 212c multiplexes a modulation symbol of each channel and a downlink reference signal and places them in a certain resource element. The radio transmitter 212d performs various kinds of signal processing on a signal from the multiplexer 212c. The radio transmitter 212d performs processing such as conversion to time domain by fast Fourier transform, addition of a guard interval, generation of a digital signal of a baseband, conversion to an analog signal, quadrature modulation, up conversion, removal of extra frequency components, or power amplification, for example. The signal generated by the transmission processing unit 212 is transmitted from the antenna 213.

The storage unit 22 is a data-readable/writable storage apparatus such as a DRAM, an SRAM, a flash memory, or a hard disk. The storage unit 22 functions as storage means of the non-ground station 20. The storage unit 22 stores therein switching information. The switching information is information used by the communication apparatus 50 for switching of the base station. The switching information includes information such as resource information, trigger information, or timing advance information.

The resource information is information on a radio resource used by the connected communication apparatus 50 for performing radio communication with a switching candidate base station configured to be movable. The trigger information is information used by the communication apparatus 50 for determining whether the connected base station is switched. The timing advance information is information on timing advance for the communication apparatus 50 to connect to the switching candidate base station. The resource information, the trigger information, and the timing advance information will be described below in detail.

The controller 23 is a controller controlling the units of the non-ground station 20. The controller 23 is implemented by a processor such as a central processing unit (CPU) or a micro processing unit (MPU), for example. The controller 23 is implemented by executing various kinds of computer programs stored in the storage apparatus within the non-ground station 20 by the processor with a random access memory (RAM) or the like as a working area, for example. The controller 23 may be implemented by an integrated circuit such as an application specific integrated circuit (ASIC) or a field programmable gate array (FPGA). The CPU, the MPU, the ASIC, and the FPGA can all be regarded as the controller.

[Ground Station]

Figure 7:
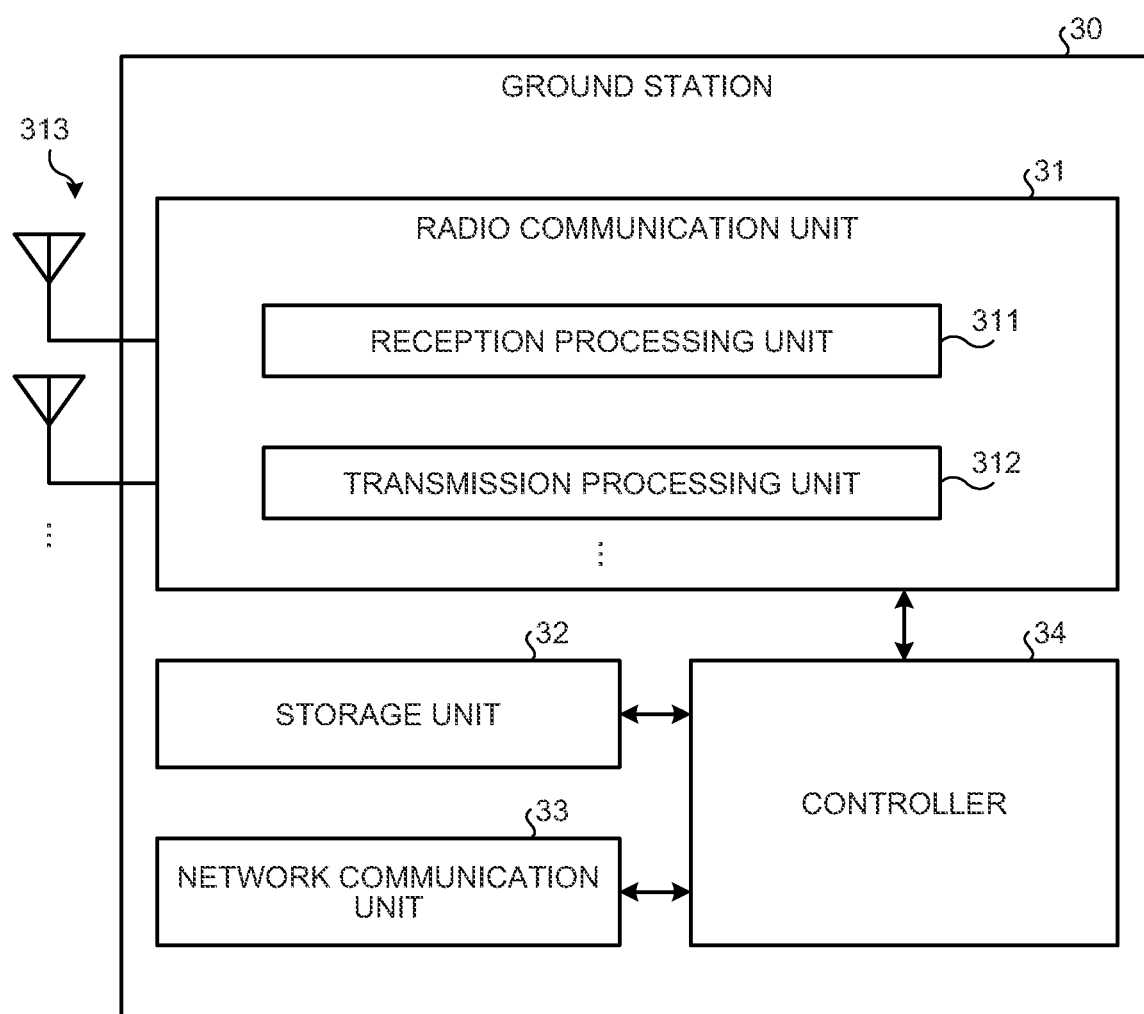
FIG. 7 is a diagram of a configuration example of a ground station according to the embodiment of the present disclosure.

The following describes a configuration of the ground station 30. FIG. 7 is a diagram of a configuration example of the ground station 30 according to the embodiment of the present disclosure. The ground station 30 includes a radio communication unit 31, a storage unit 32, a network communication unit 33, and a controller 34. The configuration illustrated in FIG. 7 is a functional configuration, and a hardware configuration may be different from this example. The function of the ground station 30 may be implemented by being distributed to a plurality of physically separated structures.

The radio communication unit 31 is a radio communication interface performing radio communication with another radio communication apparatus (the communication apparatus 50, for example). The radio communication unit 31 includes a reception processing unit 311, a transmission processing unit 312, and an antenna 313. The configurations of the radio communication unit 31, the reception processing unit 311, the transmission processing unit 312, and the antenna 313 are similar to those of the radio communication unit 21, the reception processing unit 211, the transmission processing unit 212, and the antenna 213 of the non-ground station 20.

The storage unit 32 is a data-readable/writable storage apparatus such as a DRAM, an SRAM, a flash memory, or a hard disk. The storage unit 32 functions as storage means of the ground station 30. The configuration of the storage unit 32 is similar to that of the storage unit 22 of the non-ground station 20.

The network communication unit 33 is a communication interface for communicating with another apparatus. The network communication unit 33 is a LAN network such as NIC, for example. The network communication unit 33 may be a wired interface or a wireless interface. The network communication unit 33 functions as network communication means of the ground station 30. The network communication unit 33 communicates with the management apparatus 10 and the relay station 60 in accordance with control of the controller 34.

The controller 34 is a controller controlling the units of the ground station 30. The configuration of the controller 34 is similar to that of the controller 23 of the non-ground station 20.

[2-4. Configuration of Relay Station]

Figure 8:
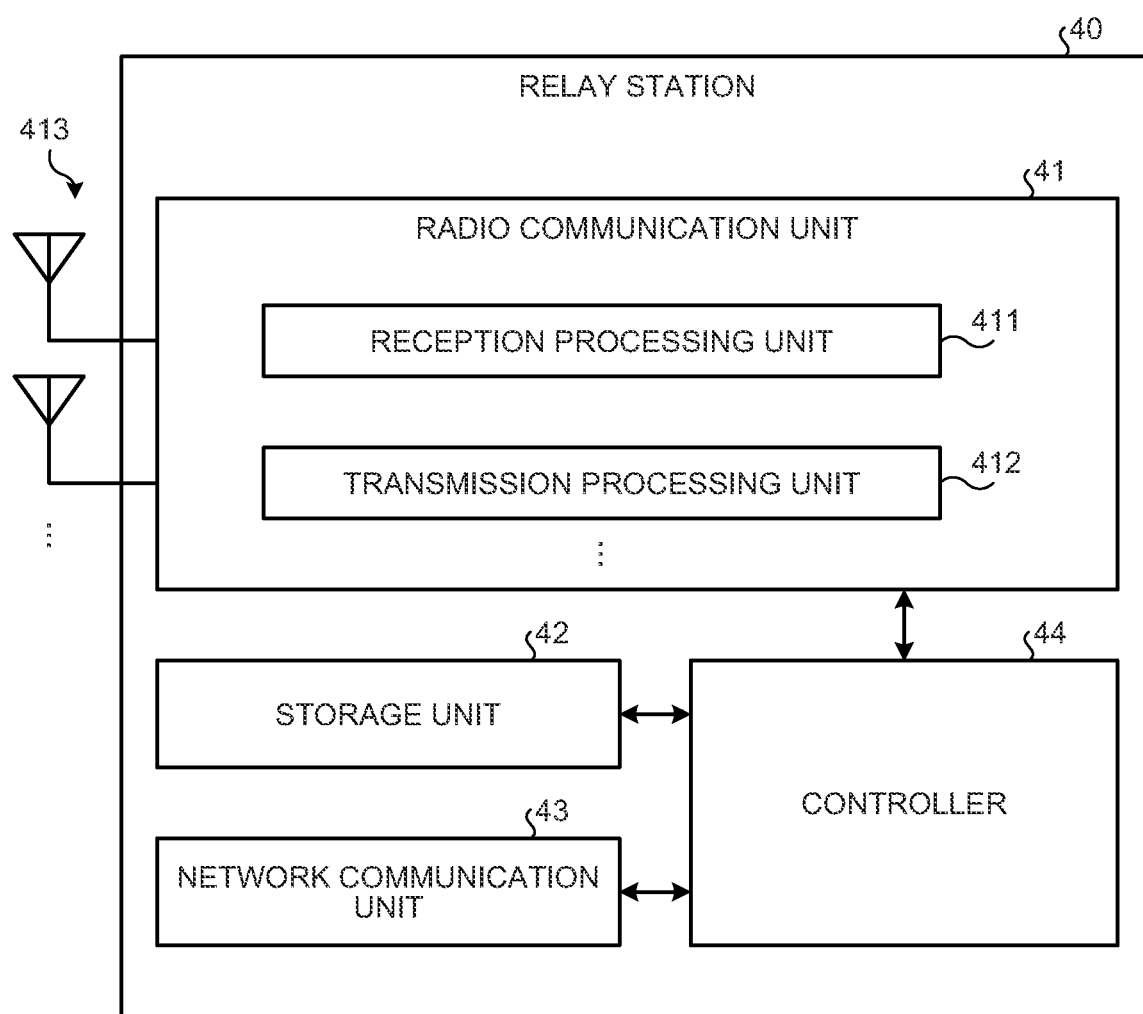
FIG. 8 is a diagram of a configuration example of a relay station according to the embodiment of the present disclosure.

The following describes a configuration of the relay station 40. FIG. 8 is a diagram of a configuration example of the relay station 40 according to the embodiment of the present disclosure. The relay station 40 includes a radio communication unit 41, a storage unit 42, a network communication unit 43, and a controller 44. The configuration illustrated in FIG. 8 is a functional configuration, and a hardware configuration may be different from this example. The function of the relay station 40 may be implemented by being distributed to a plurality of physically separated structures.

The radio communication unit 41 is a radio communication interface performing radio communication with another radio communication apparatus (the non-ground station 20, the ground station 30, or the communication apparatus 50, for example). The radio communication unit 41 includes a reception processing unit 411, a transmission processing unit 412, and an antenna 413. The configurations of the radio communication unit 41, the reception processing unit 411, the transmission processing unit 412, and the antenna 413 are similar to those of the radio communication unit 21, the reception processing unit 211, the transmission processing unit 212, and the antenna 213 of the non-ground station 20.

The storage unit 42 is a data-readable/writable storage apparatus such as a DRAM, an SRAM, a flash memory, or a hard disk. The storage unit 42 functions as storage means of the relay station 40. The configuration of the storage unit 42 is similar to that of the storage unit 22 of the non-ground station 20.

The network communication unit 43 is a communication interface for communicating with another apparatus. The network communication unit 43 is a LAN interface such as NIC, for example. The network communication unit 43 may be a wired interface or a wireless interface. The network communication unit 43 functions as network communication means of the relay station 40. The network communication unit 43 communicates with the non-ground station 20 and the ground station 30 in accordance with control of the controller 44.

The controller 44 is a controller controlling the units of the relay station 40. The configuration of the controller 44 is similar to that of the controller 23 of the non-ground station 20.

[2-5. Configuration of Communication Apparatus]

Figure 9:
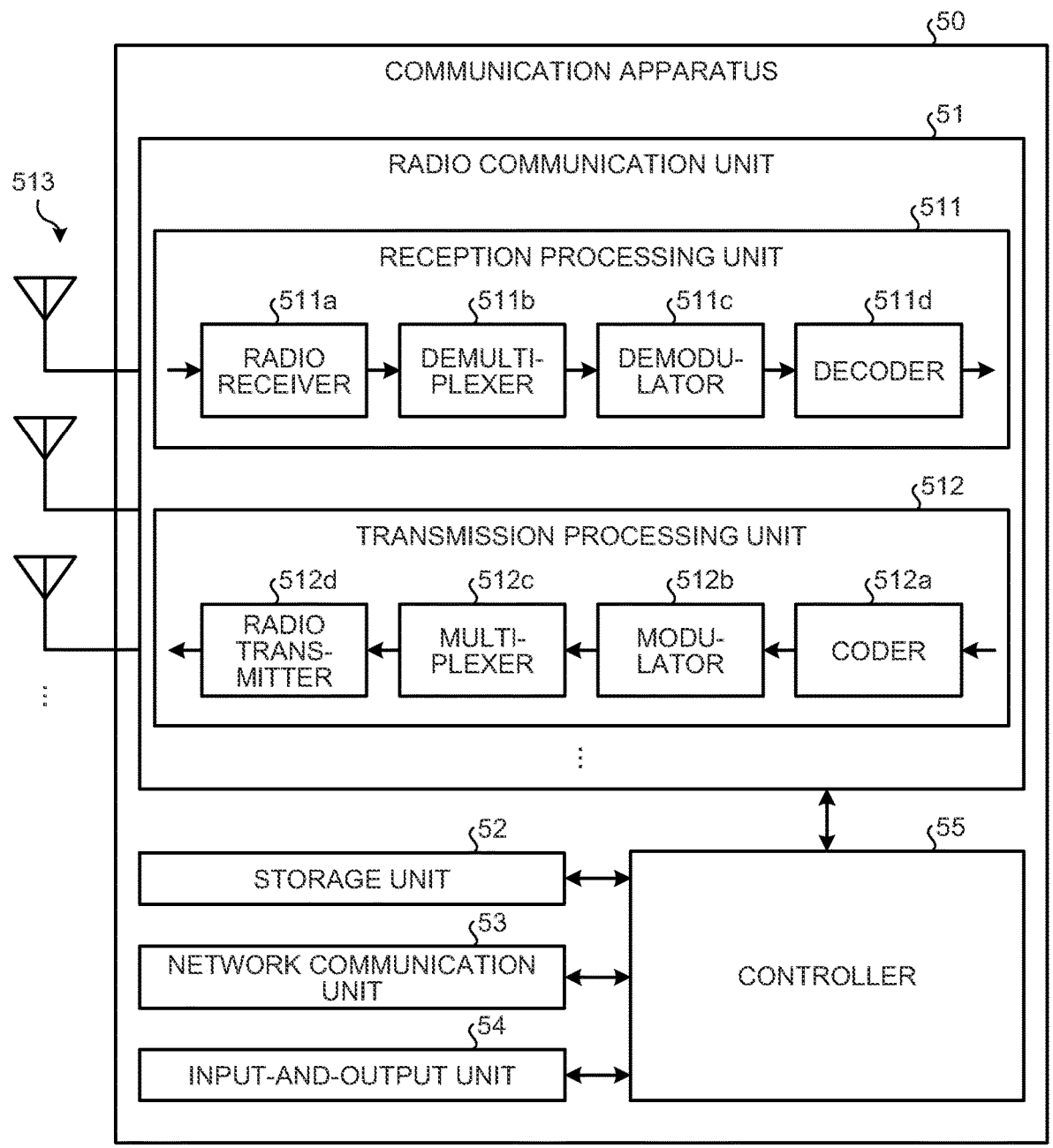
FIG. 9 is a diagram of a configuration example of a communication apparatus according to the embodiment of the present disclosure.

The following describes a configuration of the communication apparatus 50. FIG. 9 is a diagram of a configuration example of the communication apparatus 50 according to the embodiment of the present disclosure. The communication apparatus 50 includes a radio communication unit 51, a storage unit 52, a network communication unit 53, an input-and-output unit 54, and a controller 55. The configuration illustrated in FIG. 9 is a functional configuration, and a hardware configuration may be different from this example. The function of the communication apparatus 50 may be implemented by being distributed to a plurality of physically separated structures.

The radio communication unit 51 is a wireless communication interface performing radio communication with another radio communication apparatus (the non-ground station 20, the ground station 30, or the relay station 40, for example). The radio communication unit 51 is ready for one or a plurality of radio access systems. The radio communication unit 51 is ready for both NR and LTE, for example. The radio communication unit 51 may be ready for W-CDMA and cdma2000 in addition to NR and LTE. The radio communication unit 51 includes a reception processing unit 511, a transmission processing unit 512, and an antenna 513. The radio communication unit 51 may include a plurality of each of reception processing units 511, transmission processing units 512, and antennas 513. When the radio communication unit 51 is ready for the radio access systems, the units of the radio communication unit 51 can be configured separately for each of the radio access systems.

The reception processing unit 511 and the transmission processing unit 512 may be configured separately for LTE and NR, for example.

The reception processing unit 511 performs processing on a downlink signal received via the antenna 513. The reception processing unit 511 includes a radio receiver 511*a*, a demultiplexer 511*b*, a demodulator 511*c*, and a decoder 511*d*.

The radio receiver 511*a* performs down conversion, removal of unnecessary frequency components, control of an amplification level, quadrature demodulation, conversion to a digital signal, removal of a guard interval, extraction of a frequency domain signal by fast Fourier transform, and the like on the downlink signal. The demultiplexer 511*b* separates a downlink channel, a downlink synchronization signal, and a downlink reference signal from a signal output from the radio receiver 511*a*. The downlink channel is a channel such as a physical broadcast channel (PBCH), a physical downlink shared channel (PDSCH), or a physical downlink control channel (PDCCH). The demodulator 211*c* performs reception signal demodulation on a modulation symbol of the downlink channel using a modulation system such as BPSK, QPSK, 16QAM, 64QAM, or 256QAM. The decoder 511*d* performs decoding processing on coded bits of the demodulated downlink channel. The decoded downlink data and downlink control information are output to the controller 23.

The transmission processing unit 512 performs processing to transmit uplink control information and uplink data. The transmission processing unit 512 includes a coder 512*a*, a modulator 512*b*, a multiplexer 512*c*, and a radio transmitter 512*d*.

The coder 512*a* performs coding on the uplink control information and the uplink data input from the controller 55 using a coding system such as block coding, convoluting coding, or turbo coding. The modulator 512*b* modulates coded bits output from the coder 512*a* by a certain modulation system such as BPSK, QPSK, 16QAM, 64QAM, or 256QAM. The multiplexer 512*c* multiplexes a modulation symbol of each channel and an uplink reference signal and places them in a certain resource element. The radio transmitter 512*d* performs various kinds of signal processing on a signal from the multiplexer 512*c*. The radio transmitter 512*d* performs processing such as conversion to time domain by inverse fast Fourier transform, addition of a guard interval, generation of a digital signal of a baseband, conversion to an analog signal, quadrature modulation, up conversion, removal of extra frequency components, or power amplification, for example. The signal generated by the transmission processing unit 512 is transmitted from the antennas 513.

The storage unit 52 is a data-readable/writable storage apparatus such as a DRAM, an SRAM, a flash memory, or a hard disk. The storage unit 52 functions as storage means of the communication apparatus 50. The storage unit 52 stores therein the switching information. The switching information is information acquired from the non-ground station 20, the ground station 30, or the relay station 40 and is used by the communication apparatus 50 for switching of the base station. The switching information includes information such as resource information, trigger information, or timing advance information. The resource information, the trigger information, and the timing advance information will be described below in detail.

The network communication unit 53 is a communication interface for communicating with another apparatus. The network communication unit 53 is a LAN network such as NIC, for example. The network communication unit 53 may be a wired interface of a wireless interface. The network communication unit 53 functions as network communication means of the communication apparatus 50. The network communication unit 53 communicates with the other apparatus in accordance with control of the controller 55.

The input-and-output unit 54 is a user interface for exchanging information with a user. The input-and-output unit 54 is an operating apparatus for user to perform various kinds of operations such as a keyboard, a mouse, an operating key, or a touch panel, for example. Alternatively, the input-and-output unit 54 is a display apparatus such as a liquid crystal display or an organic electroluminescence (EL) display. The input-and-output unit 54 may be an acoustic apparatus such as a speaker or a buzzer. The input-and-output unit 54 may be a lighting apparatus such as a light emitting diode (LED) lamp. The input-and-output unit 54 functions as input-and-output means (input means, output means, operating means, or reporting means) of the communication apparatus 50.

The controller 55 is a controller controlling the units of the communication apparatus 50. The controller 55 is implemented by a processor such as a CPU or an MPU, for example. The controller 55 is implemented by executing various kinds of computer programs stored in the storage apparatus within the communication apparatus 50 by the processor with a RAM or the like as a working area, for example. The controller 55 may be implemented by an integrated circuit such as an ASIC or an FPGA. The CPU, the MPU, the ASIC, and the FPGA can all be regarded as the controller.

[2-6. Initial Connection Processing]

Figure 10:
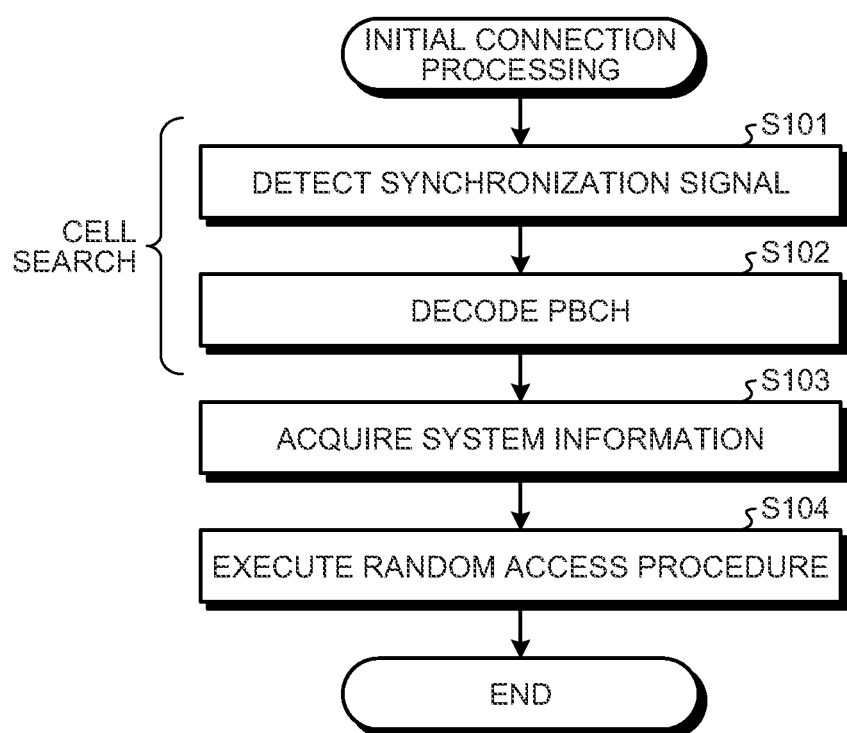
FIG. 10 is a flowchart of exemplary initial connection processing.

The following describes operation of the communication system 1. The following first describes initial connection processing. The initial connection processing is processing for causing the communication apparatus 50 to transition from an idle state (RRC_IDLE), in which the communication apparatus 50 is not connected to any cells, to a connected state (RRC_CONNECTED), in which the communication apparatus 50 has established connection with any cell. FIG. 10 is a flowchart of exemplary initial connection processing. The following describes the initial connection processing with reference to FIG. 10. The initial connection processing described below is executed when the communication apparatus 50 is turned on, for example.

First, the communication apparatus 50 in the idle state performs cell search. The cell search of the present embodiment includes processes of detection of the synchronization signal and decoding of the PBCH. The communication apparatus 50 detects the synchronization signal of the cell (Step S101). The controller 55 within the communication apparatus 50 performs synchronization with the cell in a downlink based on the detected synchronization signal. After establishment of the synchronization of the downlink, the controller 55 attempts decoding of the PBCH to acquire a master information block (MIB) as part of the system information (Step S102).

The system information is information reporting settings in the cell transmitting the system information. The system information includes information on access to the cell, information on cell selection, and information on other RATs and other systems, for example. The system information includes the MIB and a system information block (SIB). The MIB is information on a physical layer required for receiving the SIB and the like and is information with a fixed payload size reported by the PBCH. The MIB includes the system band width of the downlink, part of a system frame number, and scheduling information of the SIB. The SIB is system information other than the MIB and is reported by the PDSCH.

The system information is classified into first system information, second system information, and third system information, for example. The first system information and the second system information include information on access to the cell, information on acquisition of another system information, and information on cell selection. In LTE, the information included in the MIB is the first system information. Information included in an SIB1 and an SIB2 of the SIB is the second system information. The residual system information is the third system information.

In NR also, the system information is reported from an NR cell. The physical channel conveying the system information may be transmitted by a slot or a mini slot. The mini slot is defined by a symbol number smaller than the symbol number of the slot. The physical channel conveying the system information is transmitted by the mini slot, whereby the time required for beam sweep is reduced, and overhead can be reduced. In NR, the first system information is transmitted by an NR-PBCH, whereas the second system information is transmitted by a physical channel different from the NR-PBCH.

The controller 55 within the communication apparatus 50 acquires the second system information based on the MIB (that is, the first system information) (Step S103). As described above, the second system information includes the SIB1 and the SIB2. The SIB1 is cell access restriction information and scheduling information of the system information other than the SIB1. The SIB1 includes cell access information, cell selection information, maximum uplink transmission power information, TDD configuration information, the cycle of the system information, mapping information of the system information, and the length of a system information (SI) window. The SIB2 includes connection forbidding information, radio resource configuration information common to cells (radio resource configuration common), and uplink carrier information. The radio resource configuration information common to cells includes configuration information of a physical random access channel (PRACH) and a random access channel (RACH) common to cells.

When the controller 55 has been unable to acquire the system information required for establishment of link, the controller 55 within the communication apparatus 50 determines that access to the cell is forbidden. When all the first system information and the second system information have been unable to be acquired, for example, the controller 55 determines that access to the cell is forbidden. In this case, the controller 55 ends the initial connection processing.

When the system information has been able to be acquired, the controller 55 executes a random access procedure based on the first system information and/or the second system information (Step S104). The random access procedure may be called an RACH procedure or an RA procedure. Upon completion of the random access procedure, the communication apparatus 50 transitions from the idle state (RRC_IDLE) to the connected state (RRC_CONNECTED).

[2-7. Random Access Procedure]

The following describes the random access procedure. The random access procedure is executed for the purpose of "RRC connection setup" from the idle state to the connected state (or a non-active state), "state transition request" from the non-active state to the connected state, and the like. The random access procedure is also used for the purpose of "scheduling request" performing a resource request for uplink data transmission and "timing advance adjustment" adjusting the synchronization of the uplink. In addition, the random access procedure is executed in the case of "on-demand SI request" requesting the system information that has not been transmitted, "beam recovery" recovering interrupted beam connection, "handover" switching a connected cell, and the like.

"RRC connection setup" is an operation executed when the communication apparatus 50 connects to the base station in accordance with the occurrence of traffic or the like and is specifically an operation to deliver information on connection (UE context, for example) from the base station to the communication apparatus 50. The UE context is managed by certain communication apparatus identification information (C-RNTI, for example) instructed from the base station. The communication apparatus 50, upon end of this operation, state-transitions from the idle state to the non-active state or from the idle state to the connected state.

"State transition request" is an operation to make a request for state transition from the non-active state to the connected state in accordance with the occurrence of traffic or the like by the communication apparatus 50. Transitioning to the connected state, the communication apparatus 50 can transmit and receive unicast data to and from the base station.

"Scheduling request" is an operation to make a resource request for uplink data transmission in accordance with the occurrence of traffic or the like by the communication apparatus 50. The base station, upon normal reception of this scheduling request, assigns a PUSCH resource to the communication apparatus 50. The scheduling request is also performed by the PUCCH.

"Timing advance adjustment" is an operation for adjusting a frame error between the downlink and the uplink caused by a transmission delay. The communication apparatus 50 transmits the PRACH with timing adjusted to a downlink frame. Thus, the base station can recognize the transmission delay with respect to the communication apparatus 50 and can instruct the value of timing advance to the communication apparatus 50 by Message 2 or the like.

"On-demand SI request" is an operation to make a request for transmission of the system information to the base station when the system information that has not been transmitted for the purpose of the overhead of the system information or the like is necessary for the communication apparatus 50.

"Beam recovery" is an operation to make a recovery request when communication quality degrades by movement of the communication apparatus 50, interruption of a communication route by another object, or the like after a beam is established. The base station that has received this request attempts connection with the communication apparatus 50 using a different beam.

"Handover" is an operation to switch connection from a connected cell (a serving cell) to a cell adjacent to the cell (a neighbor cell) by a change in a radio wave environment or the like by movement of the communication apparatus 50 or the like. The communication apparatus 50 that has received a handover command from the base station makes a connection request to the neighbor cell designated by the handover command.

The random access procedure includes a contention based random access procedure and a non-contention based random access procedure. The following first describes the contention based random access procedure.

The random access procedure described below is a random access procedure assuming that the RAT supported by the communication system 1 is LTE. However, the random access procedure described below can also be applied to a case in which the RAT supported by the communication system 1 is other than LTE.

[Contention Based Random Access Procedure]

Figure 11:
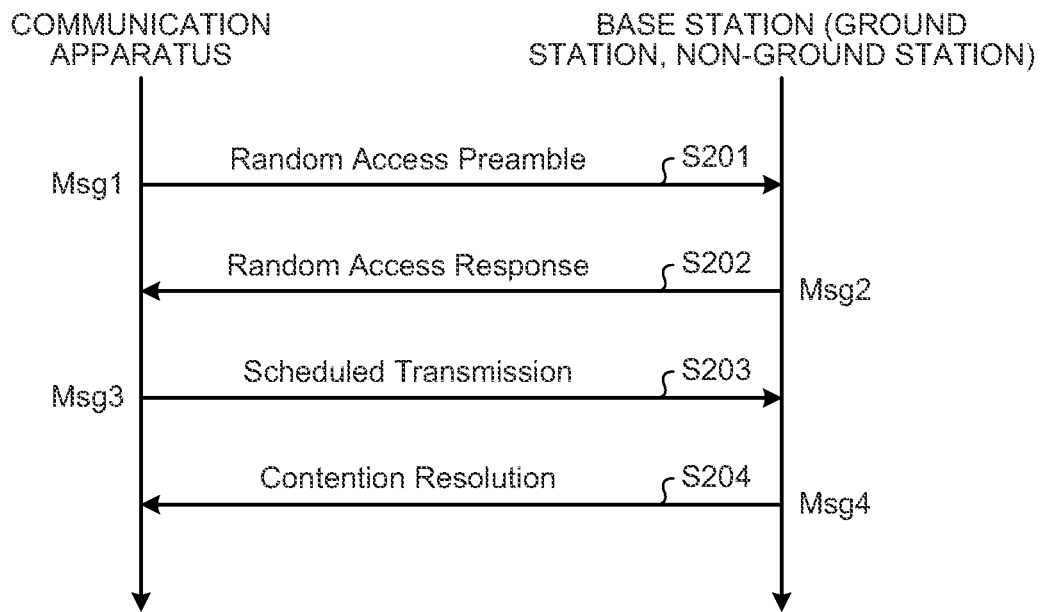
FIG. 11 is a sequence diagram of a contention based random access procedure.

The contention based random access procedure is a random access procedure performed under the initiative of the communication apparatus 50. FIG. 11 is a sequence diagram of the contention based random access procedure. As illustrated in FIG. 11, the contention based random access procedure is a four-step procedure beginning with transmission of a random access preamble from the communication apparatus 50. The contention based random access procedure includes processes of transmission of the random access preamble (Msg1), reception of a random access response (Msg2), transmission of a message (Msg3), and reception of a contention resolution message (Msg4).

First, the controller 55 within the communication apparatus 50 randomly selects a preamble sequence to be used out of a plurality of preamble sequences set in advance. The controller 55 then transmits a message including the selected preamble sequence (Msg1: Random Access Preamble) to the connected base station (Step S201). In this process, the base station may be the non-ground station 20 or the ground station 30. In the following description, it is assumed that the base station to which the controller 55 transmits the random access preamble is the non-ground station 20. The random access preamble is transmitted by the PRACH.

The 23 controller of the non-ground station 20, upon reception of the random access preamble, transmits the random access response (Msg2: Random Access Response) thereto to the communication apparatus 50. This random access response is transmitted using the PDSCH, for example. The controller 55 within the communication apparatus 50 receives the random access response (Msg2) transmitted from the base station (Step S202). The random access response includes one or a plurality of random access preambles that have been able to be received by the base station and an uplink (UL) resource (hereinafter, referred to as uplink grant) corresponding to the random access preambles. The random access response includes a temporary cell radio network temporary identifier (TC-RNTI) as an identifier unique to the communication apparatus 50 that the base station has temporarily assigned to the communication apparatus 50.

The controller 55 of the communication apparatus 50, upon reception of the random access response from the base station, determines whether the reception information includes the random access preamble transmitted at Step S201. If the random access preamble is included, the controller 55 extracts the uplink grant corresponding to the random access preamble transmitted at Step S201 out of the uplink grant included in the random access response. The controller 55 then transmits a UL message (Msg3: Scheduled Transmission) using a resource scheduled by the extracted uplink grant (Step S203). Transmission of the message (Msg3) is performed using the PUSCH. The message (Msg3) includes an RRC message for a radio resource control (RRC) connection request. The message (Msg3) includes an identifier of the communication apparatus 50.

In the contention based random access procedure, the random access preamble randomly selected by the communication apparatus 50 is used for the procedure. Thus, a case can occur in which the communication apparatus 50 transmits the random access preamble, and at the same time, another communication apparatus 50 transmits the same random access preamble to the non-ground station 20. Given these circumstances, the controller 23 of the non-ground station 20 receives the identifier transmitted by the communication apparatus 50 at Step S203, thereby recognizes with which communication apparatus 50 preamble contention has occurred, and performs contention resolution. The controller 23 transmits contention resolution (Msg4: Contention Resolution) to the communication apparatus 50 selected by the contention resolution. The contention resolution (Msg4) includes the identifier transmitted by the controller 55 at Step S203. The contention resolution (Msg4) includes an RRC message of RRC connection setup. The controller 55 receives the contention resolution message (Msg4) transmitted from the base station (Step S204).

The controller 55 of the communication apparatus 50 compares the identifier transmitted at Step S203 and the identifier received at Step S204 with each other. When the identifiers do not match, the controller 55 again performs the random access procedure from Step S201. When the identifiers match, the controller 55 performs an RRC connection operation to transition from the idle state (RRC_IDLE) to the connected state (RRC_CONNECTED). The controller 55 uses the TC-RNTI acquired at Step S202 as a cell radio network temporary identifier (C-RNTI) in the subsequent communication. After transitioning to the connected state, the controller 55 transmits an RRC message of RRC connection setup completion to the base station. The message of RRC connection setup completion is also referred to as Message 5. Through this series of operations, the communication apparatus 50 connects to the base station.

The contention based random access procedure illustrated in FIG. 11 is a four-step random access procedure. However, the communication system 1 can also support a two-step random access procedure as the contention based random access procedure. The controller 55 of the communication apparatus 50 also performs transmission of the message (Msg3) shown at Step S203 together with transmission of the random access preamble, for example. The controller 23 of the non-ground station 20 then performs transmission of the random access response (Msg2) and the contention resolution (Msg4) as responses thereto. The random access procedure is completed with two steps, and thus the communication apparatus 50 can quickly connect to the non-ground station 20.

[Non-Contention Based Random Access Procedure]

Figure 12:
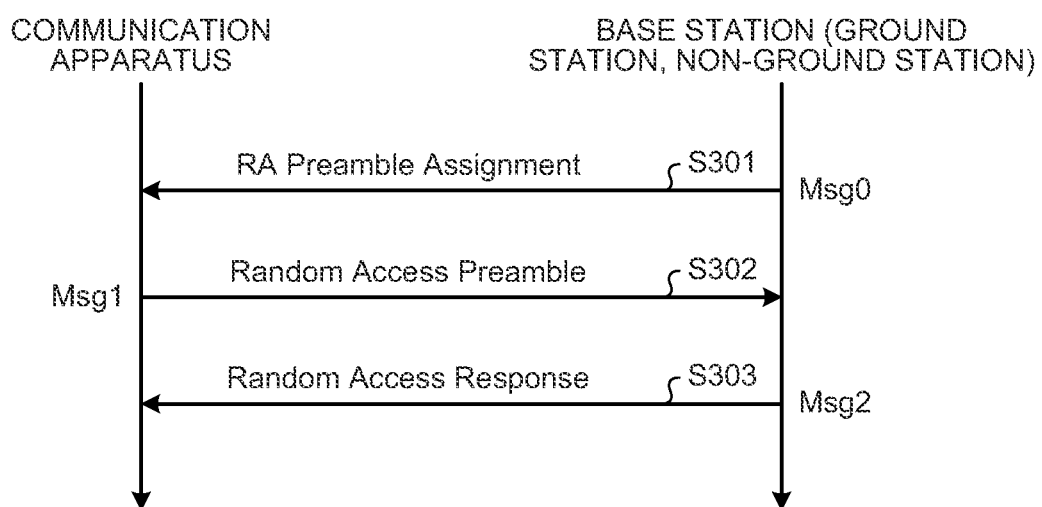
FIG. 12 is a sequence diagram of a non-contention based random access procedure.

The following describes the non-contention based random access procedure. The non-contention based random access procedure is a random access procedure performed under the initiative of the base station. FIG. 12 is a sequence diagram of the non-contention based random access procedure. The non-contention based random access procedure is a three-step procedure beginning with transmission of random access preamble assignment from the base station. The non-contention based random access procedure includes processes of reception of the random access preamble assignment (Msg0), transmission of the random access preamble (Msg1), and reception of the random access response (Msg2). In the following description of the random access procedure, it is assumed that the base station is the non-ground station 20; however, the base station may be the ground station 30.

In the contention based random access procedure, the controller 55 of the communication apparatus 50 randomly selects a preamble sequence. In the non-contention based random access procedure, however, the non-ground station 20 assigns an individual random access preamble to the communication apparatus 50. The controller 55 of the communication apparatus 50 receives the random access preamble assignment (Msg0: RA Preamble Assignment) from the non-ground station 20 (Step S301).

The controller 55 of the communication apparatus 50 executes random access to the non-ground station 20 using the random access preamble assigned at Step S301. That is to say, the controller 55 of the communication apparatus 50 transmits the assigned random access preamble (Msg1: Random Access Preamble) to the non-ground station 20 by the PRACH (Step S302).

The controller 23 of the non-ground station 20 receives the random access preamble (Msg1) from the communication apparatus 50. The controller 23 transmits the random access response (Msg2: Random Access Response) to the random access preamble to the communication apparatus 50 (Step S303). The random access response includes information on the uplink grant corresponding to the received random access preamble, for example. The controller 55 of the communication apparatus 50, upon reception of the random access response (Msg2), performs an RRC connection operation to transition from the idle state (RRC_IDLE) to the connected state (RRC_CONNECTED).

Thus, in the non-contention based random access procedure, the base station schedules the random access preamble, thus making it hard to cause a preamble collision.

[Details of Random Access Procedure of NR]

The random access procedure with the RAT supported by the communication system 1 assumed to be LTE has been described. The random access procedure can be applied to RATs other than LTE. The following describes a random access procedure with the RAT supported by the communication system 1 assumed to be NR in detail. In the following description, the four steps about Msg1 to Msg4 illustrated in FIG. 11 or FIG. 12 will be described in detail. The step of Msg1 corresponds to Step S201 illustrated in FIG. 11 and Step S302 illustrated in FIG. 12. The step of Msg2 corresponds to Step S202 illustrated in FIG. 11 and Step S303 illustrated in FIG. 12. The step of Msg3 corresponds to Step S203 illustrated in FIG. 11. The step of Msg4 corresponds to Step S204 illustrated in FIG. 11.

[Random Access Preamble (Msg1) of NR]

In NR, the PRACH is called an NR physical random access channel (NR-PRACH). The NR-PRACH is formed using the Zadoff-Chu sequence or the M sequence. In NR, as the format of the NR-PRACH, a plurality of preamble formats are prescribed. The preamble formats are prescribed by a combination of parameters such as a subcarrier interval of the PRACH, a transmission band width, a sequence length, a symbol number for use in transmission, a transmission repeated number, a cyclic prefix (CP) length, and a guard period length. The preamble formats may designate the type of the sequence for use in the transmission of the NR-PRACH (the Zadoff-Chu sequence or the M sequence). The type of the preamble sequence of the NR-PRACH is numbered. The number of the type of the preamble sequence is called a preamble index.

In NR, a setting about the NR-PRACH is performed on the communication apparatus 50 in the idle state by the system information. Furthermore, a setting about the NR-PRACH is performed on the communication apparatus 50 in the connected state by exclusive RRC signaling.

The controller 55 of the communication apparatus 50 transmits the NR-PRACH using a physical resource that can transmit the NR-PRACH (NR-PRACH occasion). The physical resource is instructed by the setting about the NR-PRACH. The controller 55 of the communication apparatus 50 selects any physical resource to transmit the NR-PRACH. Furthermore, when the communication apparatus 50 is in the connected state, the controller 55 transmits the NR-PRACH using an NR-PRACH resource. The NR-PRACH resource is a combination of an NR-PRACH preamble and its physical resource. The base station can instruct the NR-PRACH resource to the communication apparatus 50. In this process, the base station may be the non-ground station 20 or the ground station 30. In the following description of a random access procedure of NR, it is assumed that the base station is the non-ground station 20.

The NR-PRACH is also transmitted when the random access procedure has failed. The controller 55 of the communication apparatus 50, when resending the NR-PRACH, waits for transmission of the NR-PRACH for a waiting period calculated from the value of back off (a back off indicator: BI). The value of back off may vary depending on the terminal category of the communication apparatus 50 or the preference of traffic that has occurred. In that case, a plurality of values of back off are reported, and the communication apparatus 50 selects the value of back off to be used based on the preference. When resending the NR-PRACH, the communication apparatus 50 increases the transmission power of the NR-PRACH compared with the first sending. This procedure is referred to as power ramping.

[Random Access Response (Msg2) of NR]

The random access response of NR is transmitted using an NR physical downlink shared channel (NR-PDSCH). The NR-PDSCH including the random access response is scheduled by an NR physical downlink control channel (NR-PDCCH) with cyclic redundancy check (CRC) scrambled by an RA-RNTI. The NR-PDCCH is transmitted by a common control sub-band. The NR-PDCCH is placed in a common search space (CSS). The value of a random access radio network temporary identifier (RA-RNTI) is determined based on a transmission resource of the NR-PRACH corresponding to the random access response. The transmission resource of the NR-PRACH is a time resource (a slot or a subframe) and a frequency resource (a resource block), for example. The NR-PDCCH may be placed in a search space associated with the NR-PRACH associated with the random access response. Specifically, the search space in which the NR-PDCCH is placed is set in association with the physical resource by which the preamble of the NR-PRACH and/or the NR-PRACH has been transmitted. The search space in which the NR-PDCCH is placed is set in association with the preamble index and/or an index of the physical resource. The NR-PDCCH is NR synchronization signal (NR-SS) and quasi co-location (QCL).

The random access response of NR is information on medium access control (MAC). The random access respond of NR includes at least the uplink grant for transmitting Message 3 of NR, the value of timing advance for use in adjustment of frame synchronization of the uplink, and the value of the TC-RNTI. The random access response of NR includes a PRACH index used for transmission of the NR-PRACH corresponding to the random access response. The random access response of NR includes information on back off for use in waiting for the transmission of the PRACH.

The controller 23 of the non-ground station 20 transmits the random access response by the NR-PDSCH. The controller 55 of the communication apparatus 50 determines whether transmission of the random access preamble has succeeded from the information included in the random access response. When it is determined that transmission of the random access preamble has failed, the controller 55 performs processing to transmit Message 3 (Msg3) of NR in accordance with the information included in the random access response. When transmission of the random access preamble has failed, the controller 55 determines that the random access procedure has failed and performs processing to resend the NR-PRACH.

The random access response of NR may include a plurality of uplink grants for transmitting Message 3 (Msg3) of NR. The controller 55 of the communication apparatus 50 can select one resource transmitting Message 3 (Msg3) from the uplink grants. Thus, a collision of the Message 3 (Msg3) transmission of NR when the same random access response of NR has been received by different communication apparatuses 50 can be lessened. Consequently, the communication system 1 can provide a more stable random access procedure.

[Message 3 (Msg3) of NR]

Message 3 (Msg3) of NR is transmitted by an NR physical uplink shared channel (NR-PUSCH). The NR-PUSCH is transmitted using a resource instructed by the random access response. Message 3 of NR includes an RRC connection request message. The format of the NR-PUSCH is instructed by a parameter included in the system information. The parameter determines, as the format of the NR-PUSCH, which of orthogonal frequency division multiplexing (OFDM) and discrete Fourier Transform Spread OFDM (DFT-s-OFDM) is used, for example.

When normally receiving Message 3 of NR, the controller 23 of the non-ground station 20 shifts to processing to transmit the resolution message (Msg4). On the other hand, when being unable to normally receive Message 3 of NR, the controller 23 again attempts reception of Message 3 of NR at least for a certain period. As an example, the controller 23 instructs resending of Message 3 to the communication apparatus 50. In this process, the controller 23 transmits an instruction to resend Message 3 using a downlink resource after the resource instructed to send Message 3 by a certain number of slots (or subframes or radio frames).

An example of the instruction of resending of Message 3 and the transmission resource is an instruction by resending of the random access response. The NR-PDSCH including the random access response to be resent is scheduled by the NR-PDCCH with the CRC scrambled by the RA-RNTI. For the value of the RA-RNTI, the same value as the value of the RA-RNTI used in the first sending is used. That is to say, the value of the RA-RNTI is determined based on the transmission resource of the NR-PRACH corresponding to the random access response. Alternatively, the value of the RA-RNTI is determined based on information discriminating between the first sending and the resending in addition to the transmission resource of the NR-PRACH. The NR-PDCCH is placed in the common search space (CSS).

Alternatively, the NR-PDSCH including the random access response to be resent is scheduled by the NR-PDCCH with the CRC scrambled by the TC-RNTI or the C-RNTI included in the random access response transmitted in the first sending.

Another example of the instruction of resending of Message 3 and the transmission resource is an instruction by the NR-PDCCH for use in the instruction to resend Message 3. The NR-PDCCH is the uplink grant. The downlink control information (DCI) of the NR-PDCCH instructs a resource of resending of Message 3. The controller 55 of the communication apparatus 50 resends Message 3 based on the instruction of the uplink grant.

As a specific example of processing after Message 3 of NR has not been able to be normally received, the controller 23 of the non-ground station 20 attempts to receive Message 3 by a resource for resending instructed in advance. The controller 55 of the communication apparatus 50, when the contention resolution has not been transmitted from the non-ground station 20 after transmission of Message 3 within a certain period, transmits the NR-PUSCH including Message 3 using the resource for resending instructed in advance.

Alternatively, the controller 55 of the communication apparatus 50, when receiving negative acknowledgement (NACK) to Message 3, transmits the NR-PUSCH including Message 3 using the resource for resending instructed in advance corresponding to the negative acknowledgement. Information on "the resource for resending instructed in advance" is included in the system information or the random access response, for example.

When the number of times of resending of Message 3 of NR exceeds a certain number of times, or when reception of the contention resolution of NR has not succeeded within a certain period, the controller 55 of the communication apparatus 50 regards the random access procedure as a failure and performs the processing to resend the NR-PRACH. A transmission beam of the communication apparatus 50 for use in resending of Message 3 of NR may be different from a transmission beam of the communication apparatus 50 used for the first sending of Message 3. When neither the contention resolution of NR nor the instruction to resend Message 3 has been able to be received within a certain period, the controller 55 of the communication apparatus 50 regards the random access procedure as a failure and performs the processing to resend the NR-PRACH. The certain period is set by the system information, for example.

[Contention Resolution (Msg4) of NR]

The contention resolution of NR is transmitted using the NR-PDSCH. The NR-PDSCH including the contention resolution is scheduled by the NR-PDCCH with the CRC scrambled by the TC-RNTI or the C-RNTI. The NR-PDCCH is transmitted by the common control subband. The NR-PDCCH is placed in a user equipment specific search space (USS). The NR-PDCCH may be placed in the CSS.

When normally receiving the NR-PDSCH including the contention resolution, the controller 55 of the communication apparatus 50 transmits acknowledgement (ACK) to the non-ground station 20. From this point onward, the communication apparatus 50 regards the random access procedure as a success and shifts to the connected state (RRC_CONNECTED). On the other hand, when receiving negative acknowledgement (NACK) to the NR-PDSCH from the communication apparatus 50, or when there is no acknowledgement, the controller 23 of the non-ground station 20 resends the NR-PDSCH including the contention resolution. When being unable to receive the contention resolution (Msg4) of NR within a certain period, the controller 55 of the communication apparatus 50 regards the random access procedure as a failure and performs processing to resend the random access preamble (Msg1).

The communication apparatus 50 that has succeeded in the random access procedure shifts to the connected state (RRC_CONNECTED). In the communication system 1, along with movement of the communication apparatus 50 or the base station, even the communication apparatus 50 in the connected state performs switching of the connected base station, or handover, for example.

[2-8. Necessity of Switching Processing]

However, the communication apparatus 50 in the idle state detects the connected base station and, if being unable to determine whether the connected base station is the ground station 30 or the non-ground station 20, fails in radio communication with the connected base station, for example. Even if being able to determine that the connected base station is the non-ground station 20, the communication apparatus 50 cannot set the communication control for the non-ground station 20 and fails in radio communication with the connected base station. Given these circumstances, demanded in the present disclosure is a method for executing communication control according to the connected base station by the communication apparatus 50.

[2-9. Functional Configuration of Communication Apparatus]

Figure 13:
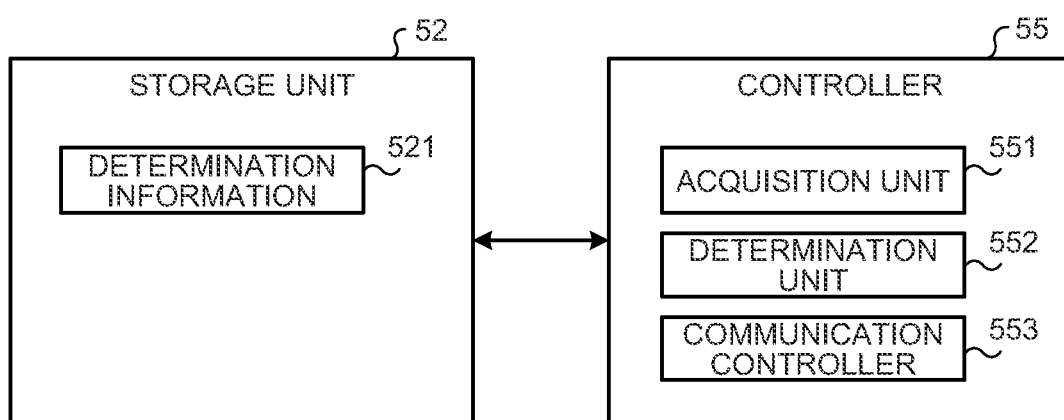
FIG. 13 is a diagram of a configuration example of a storage unit and a controller within the communication apparatus.

FIG. 13 is a diagram of a configuration example of the storage unit 52 and the controller 55 within the communication apparatus 50. The storage unit 52 is an area storing therein various kinds of information. The storage unit 52 is an area storing therein determination information 521 for determining whether the connected base station is the ground station 30 or the non-ground station 20, for example. The controller 55 has an acquisition unit 551, a determination unit 552, and a communication controller 553. The blocks forming the controller 55 (the acquisition unit 551, the determination unit 552, and the communication controller 553) are each a functional block indicating a function of the controller 55. These functional blocks may be software blocks or hardware blocks. The functional blocks described above may each be one software module implemented by software (including a micro program) or one circuit block on a semiconductor chip (die), for example. It is understood that each of the functional blocks may be one processor or one integrated circuit. Any method for forming the functional blocks can be adopted. The controller 55 may be formed by functional units different from the functional blocks described above.

The acquisition unit 551 acquires determination information from the connected base station. The connected base station is the non-ground station 20, the ground station 30, or the like before the start of the initial connection processing starting communication with the communication apparatus 50, for example. The information is a radio communication band for use in radio communication between the connected base station and the communication apparatus 50, for example. Exemplified is a case in which the acquisition unit 551 acquires the information from the connected base station; the storage unit 52 may store therein identification information such as a radio communication band for the non-ground station 20 or the ground station 30 in advance. The determination unit 552 determines whether the connected base station is the non-ground station 20 or the ground station 30 based on the acquired information.

When it is determined that the connected base station is the ground station 30, the communication controller 553 executes communication control for the ground station 30. The communication control for the ground station 30 is communication control using a communication parameter when the communication apparatus 50 performs radio communication with the ground station 30. When it is determined that the connected base station is the non-ground station 20, the communication controller 553 executes the communication control for the non-ground station 20. The communication control for the non-ground station 20 is communication control using a communication parameter when the communication apparatus 50 performs radio communication with the non-ground station 20. The communication controller 553 sets the communication parameter based on the determination information acquired from the connected base station and executes the communication control based on the set communication parameter. Exemplified is a case in which the communication controller 553 sets the communication parameter based on the determination information acquired from the connected base station; however, the communication controller 553 may store the communication parameter for the ground station 30 or the non-ground station 20 in the storage unit 52 and set the communication parameter stored in the storage unit 52; the mode can be changed as appropriate.

[Determination Unit]

The following describes details of the determination unit 552. The determination unit 552 determines whether the connected base station is the ground station 30 or the non-ground station 20 at the time of initial access with the connected base station from the idle state. Exemplified is a case of from the idle state to the time of the initial access; however, the determination unit 552 can also be applied to a case of the time of handover to switch the base station in communication after the initial access to a different base station, for example. The determination unit 552 uses a used band of radio communication used by the connected state, for example, as the determination information of the connected base station. For the convenience of description, the used band of radio communication of the non-ground station 20 is the S-band (2 to 4 GHz band) and the Ka-band (27 to 40 GHz band), for example, whereas the used band of radio communication of the ground station 30 is defined as a band other than the S-band and the Ka-band, for example, in advance. Thus, the used band of radio communication is information by which whether the connected base station is the ground station 30 or the non-ground station 20 can be determined. The determination unit 552, when the used band of radio communication of the connected base station is the used band of radio communication for the non-ground station 20, determines that the connected base station is the non-ground station 20. The determination unit 552, when the used band of radio communication of the connected base station is other than the used band of radio communication for the non-ground station 20, determines that the connected base station is the ground station 30.

For the convenience of description, as the used band of radio communication of the non-ground station 20, the S-band and the Ka-band are exemplified, for example. However, these bands are not limiting; a partial band of the S-band or the Ka-band or a band different from the S-band or the Ka-band can be employed; the mode can be changed as appropriate.

Exemplified is a case in which the determination unit 552 determines whether the connected base station is the non-ground station 20 or the ground station 30 using the used band of radio communication as the determination information of the non-ground station 20. However, the used band of radio communication is not limiting, and a synchronization signal (SS) may be used in place of the used band of radio communication, for example; the mode can be changed as appropriate.

The acquisition unit 551 acquires the SS from the connected base station. The SS is a synchronization signal for use in the cell search, for example, is associated with a physical ID of the cell of the base station, and is thus information by which whether the connected base station is the ground station 30 or the non-ground station 20 can be determined. Moreover, the SS of the non-ground station 20 is different from a subcarrier spacing used by the SS of the ground station 30. The subcarrier spacing of the SS of the non-ground station 20 is wider than the subcarrier spacing of the SS of the ground station 30, for example. As the specifications of NR, when the radio communication band of the ground station 30 is 6 GHz or less, the subcarrier spacing is defined as 15 kHz or 30 kHz, whereas when the radio communication band of the ground station 30 is greater than 6 GHz, the subcarrier spacing is defined as 120 kHz or 240 kHz, for example. On the other hand, when the radio communication band of the non-ground station 20 is 6 GHz or less, the subcarrier spacing is defined as 120 kHz, 240 kHz, or 480 kHz, for example. That is to say, the subcarrier spacing for each radio communication band of the SS of the non-ground station 20 is defined as being different from the subcarrier spacing for each radio communication band of the SS of the ground station 30. Consequently, the determination unit 552 refers to the subcarrier spacing for each radio communication band of the SS and can thereby determine whether the connected base station is the non-ground station 20 or the ground station 30.

The determination unit 552, when the SS acquired from the connected base station is the SS of the non-ground station 20, determines that the connected base station is the non-ground station 20. The determination unit 552, when the SS acquired from the connected base station is the SS of the ground station 30, determines that the connected base station is the ground station 30.

For the convenience of description, exemplified is a case in which the determination unit 552 determines whether the connected base station is the ground station 30 or the non-ground station 20 using the SS different in the subcarrier spacing for each radio communication band as the determination information. However, in place of this SS, the SS of resource mapping may be used; the mode can be changed as appropriate. Within the resource mapping, a primary synchronization signal (PSS) and a secondary synchronization signal (SSS) are placed. The PSS is a main synchronization signal detecting timing synchronization and a local ID for use in the cell search, for example, whereas the SSS is an auxiliary synchronization signal detecting frame synchronization and a cell group ID for use in the cell search, for example. The placement configuration of the PSS and the SSS within the resource mapping for the non-ground station 20 is defined as being different from the placement configuration of the PSS and the SSS within the resource mapping for the ground station 30. Thus, the SS of the resource mapping is information by which whether the connected base station is the ground station 30 or the non-ground station 20 can be determined. The determination unit 552 refers to the SS within the resource mapping to determine whether the connected base station is the ground station 30 or the non-ground station 20.

Exemplified is a case in which the determination unit 552 determines whether connected base station is the ground station 30 or the non-ground station 20 using the SS different in the subcarrier spacing. However, the SS different in a sequence such as the M-sequence or the Zadoff-Chu (ZC) sequence may be used instead, for example; the mode can be changed as appropriate. The PSS within the SS of the ground station 30 is formed with a first ZC-sequence, the SSS therewithin is formed with a first M-sequence, the PSS within the SS within the non-ground station 20 is formed with a second ZC-sequence different from the first ZC-sequence, and the SSS therewithin is formed with a second M-sequence different from the first M-sequence, for example. Thus, the sequence within the SS of the non-ground station 20 is defined as being different from the sequence within the SS of the ground station 30. Thus, the sequence within the SS is information by which whether the connected base station is the ground station 30 or the non-ground station 20 can be determined. The determination unit 552 refers to the SS different in the sequence to determine whether the connected base station is the ground station 30 or the non-ground station 20.

Exemplified is a case in which the determination unit 552 determines whether connected base station is the non-ground station 20 or the ground station 30 using the used band of radio communication as the determination information of the non-ground station 20. However, as the determination information, the used band of radio communication is not limiting, and the SIB may be used in place of the used band of radio communication, for example; the mode can be changed as appropriate.

The acquisition unit 551 acquires the SIB from the connected base station. The SIB is information for establishing communication within the cell of the connected base station. SIBxx for the non-ground station 20 is defined as being different from the SIB for the ground station 30. Thus, the SIB is information by which whether the connected base station is the ground station 30 or the non-ground station 20 can be determined.

The determination unit 552, when the SIB acquired from the connected base station is the SIBxx for the non-ground station 20, determines that the connected base station is the non-ground station 20. The determination unit 552, when the SIB acquired from the connected base station is the SIB for the ground station 30, determines that the connected base station is the ground station 30. The communication controller 553, when receiving the SIBxx from the base station, attempts connection with the non-ground station 20 using the SIBxx.

Exemplified is a case in which the SIBxx for the non-ground station 20 is totally different from the SIB for the ground station 30, in which the SIBxx for the non-ground station 20 may be defined by adding information for the non-ground station 20 to the SIB for the ground station 30; the mode can be changed as appropriate. The SIBxx for the non-ground station 20 is obtained by adding additional information for the non-ground station 20, for example, to the SIB for the ground station 30. Examples of the additional information include a flag, RACH configuration, measurement configuration, a waveform, and modulation of the non-ground station 20. The determination unit 552 refers to the additional information within the SIB to determine whether the connected base station is the non-ground station 20 or the ground station 30. In this case, the communication controller 553, when receiving the SIBxx from the connected base station, refers to the additional information for the non-ground station 20 within the SIBxx to attempt connection with the non-ground station 20.

The determination unit 552 may determine whether the connected base station is the ground station 30 or the non-ground station 20 using the cell ID in place of the used band of radio communication, for example, as the determination information; the mode can be changed as appropriate.

The acquisition unit 551 acquires the cell ID from the connected base station. The cell ID of the non-ground station 20 is defined as being different from the cell ID of the ground station 30. Thus, the cell ID is information by which whether the connected base station is the ground station 30 or the non-ground station 20 can be determined. The determination unit 552, when the cell ID acquired from the connected base station is the cell ID of the non-ground station 20, determines that the connected base station is the non-ground station 20. The determination unit 552, when the cell ID acquired from the connected base station is the cell ID of the ground station 30, determines that the connected base station is the ground station 30.

For the convenience of description, exemplified is a case in which the determination unit 552 refers to the radio communication band of the connected base station and, when the radio communication band is the S-band or the Ka-band, determines that the connected base station is the non-ground station 20. However, the determination unit 552, even when the radio communication band of the connected base station is the S-band, may successively refer to the SS, the SIB, and the cell ID and determine whether the connected base station is the non-ground station 20 by any of the SS, the SIB, and the cell ID, for example; the mode can be changed as appropriate.

[Acquisition Unit]

The following describes details of the acquisition unit 551. When it is determined that the connected base station is the non-ground station 20, the acquisition unit 551 acquires information on the non-ground station 20. The information on the non-ground station 20 is information on the altitude of the non-ground station 20, information on the moving speed of the non-ground station 20, information on the circling orbit of the non-ground station 20, information on the moving route of the non-ground station 20, information on the type of the non-ground station 20, configuration information required for control switching, or the like. The acquisition unit 551 acquires the information on the non-ground station 20 from the connected base station as the non-ground station 20. The acquisition unit 551 stores the used band of the connected base station in the storage unit 52 in advance and may thus acquire the used band from the storage unit 52.

The information on the altitude of the non-ground station 20 is information on the altitude at which the non-ground station 20 is positioned up in the air, for example. The information on the altitude is information including the absolute value of the altitude and an index corresponding to the altitude, for example, type information of the non-ground station 20 such as a GEO satellite, a non-GEO satellite, a MEO satellite, or a LEO satellite, for example, and type information of the non-ground station 20 such as an artificial satellite or a drone, for example. The base station of the GEO satellite is a base station such as an artificial satellite circling the earth, the base station of the LEO is a base station such as an artificial satellite circling the earth on a low earth orbit, and the base station of the MEO is a base station such as an artificial satellite circling the earth on a medium earth orbit between the GEO and the LEO.

The information on the moving speed of the non-ground station 20 is information on the speed at which the non-ground station 20 moves, for example. The information on the moving speed is information including the absolute value of the moving speed, an index corresponding to the moving speed, information indicating whether the non-ground station 20 is stationary or moving, and information on a moving route, a moving time, and the like, for example. The information on the circling orbit of the non-ground station 20 is information on an orbit on which the non-ground station 20 circles the earth, for example. The information on the circling orbit is information including the absolute value of the circling orbit, an index corresponding to the circling orbit, and an information on an inclination angle of a satellite having certain directivity to the ground and the like, for example.

The information on the moving route of the non-ground station 20 is information on the route through which the non-ground station 20 moves, for example. The information on the moving route is information including a map of moving routes through which the non-ground station 20 moves and information discriminating whether the non-ground station 20 moves regularly or irregularly. The information on the type of the non-ground station 20 is type information of the base station such as the GEO, the non-GEO, the MEO, the LEO, the drone, the airplane, or the balloon, information on the size of the non-ground station 20 and transmittable electric energy, and the like, for example. The configuration information required for control switching is information on the RACH configuration for the non-ground station, the measurement configuration, and the like, for example.

Exemplified is a case in which the determination unit 552 described above determines whether the connected base station is the non-ground station 20 or the ground station 30 using the used band of radio communication, the SIB, the cell ID, or the like of the connected base station, for example. However, the determination unit 552 may determine whether the connected base station is the non-ground station or the ground station using information on the non-ground station 20 or the ground station 30 acquired from the connected base station; the mode can be changed as appropriate. The information on the non-ground station 20 is the information on the altitude of the non-ground station 20, the information on the moving speed of the non-ground station 20, the information on the circling orbit of the non-ground station 20, the information on the moving route of the non-ground station 20, the information on the type of the non-ground station 20, the information required for control switching, and the like.

[Communication Controller]

The following describes details of the communication controller 553. The communication controller 553 executes the communication control for the non-ground station 20 or the ground station 30 based on the information acquired by the acquisition unit 551. When it is determined that the connected base station is the ground station 30, the communication controller 553 may implicitly switch to the communication control for the ground station 30 based on the information acquired by the acquisition unit 551. Alternatively, the communication controller 553 may explicitly switch the acquired information as the communication control for the ground station 30. When it is determined that the connected base station is the non-ground station 20, the communication controller 553 may implicitly switch to the communication control for the non-ground station 20 based on the information acquired by the acquisition unit 551. Alternatively, the communication controller 553 may explicitly switch the acquired information as the communication control for the non-ground station 20.

When it is determined that the connected base station is the ground station 30, the communication controller 553 executes the communication control for the ground station 30. When it is determined that the connected base station is the non-ground station 20, the communication controller 553 executes the communication control for the non-ground station 20. The communication control includes control using cell selection criteria, measurement configuration, RACH configuration, a waveform, a multi-access system, or a modulation and coding scheme (MCS), for example. Furthermore, the communication control includes control using channel quality indicator (CQI), hybrid automatic repeat request (HARQ), power control, tracking area, sub-physical resource block (PRB), or the like.

The cell selection criteria are communication control selecting a cell by the communication apparatus 50 using expressions. Expressions for the non-ground station 20 are different from expressions for the ground station 30. The expressions for the non-ground station 20 add a correction term $Q_{NTN}$ such as the type of the non-ground station 20, the altitude of the non-ground station 20, the moving speed of the non-ground station 20, or the circling orbit of the non-ground station 20, for example, to the expression terms for the ground station 30. NTN is the non-terrestrial network. The acquisition unit 551 acquires the expressions for the ground station 30 or the expressions for the non-ground station 20, parameters, and the like from the connected base station.

The expressions for the non-ground station 20 are expressed as $Srxlev = Q_{rxlevmeas} - (Q_{rxlevmin} + Q_{rxlevminoffset}) - P_{compensation} - Qoffset_{temp} + Q_{NTN}$ (Expression 1) and $Squal = Q_{qualmeas} - (Q_{qualmin} + Q_{qualminoffset}) - Qoffset_{temp} + Q_{NTN}$ (Expression 2) under the conditions of Srxlev>0 and Squal>0. Srxlev is a cell selection RX level value (dB), whereas Squal is a cell selection quality value (dB). $Q_{rxlevmeas}$ is a measured cell RX level value (reference signal received power (RSRP)) as a measurement result. $Q_{qualmeas}$ is a measured cell selection quality value (reference signal received quality (RSRQ)) as a measurement result. $Q_{rxlevmin}$ is a minimum required RX level in the cell (dBm), whereas $Q_{qualmin}$ is a minimum required quality level in the cell (dB). $Q_{rxlevminoffset}$ is a first offset value (offset to the signalled $Q_{rxlevmin}$ taken into account in the Srxlev evaluation). $Q_{qualminoffset}$ is a second offset value (offset to the signalled $Q_{qualmin}$ taken into account in the Squal evaluation). $P_{compensation}$ is information of (If the UE supports the additional Pmax in the NS-PmaxList, if present, in SIB1). $Qoffset_{temp}$ is a third offset (offset temporarily applied to a cell (dB)).

The expressions for the non-ground station 20 are not limited to Expression 1 and Expression 2, and a cell selection value for NTN (dB) ($S_{NTN}$) may be added as a cell selection value to Expression 1 and Expression 2 under the conditions of Srxlev>0, Squal>0, and $S_{NTN}$>0, for example; the mode can be changed as appropriate. The unit is not limited to dB.

When it is determined that the connected base station is the non-ground station 20, the communication controller 553 executes the communication control such as the cell selection for the non-ground station 20 using the expressions for the non-ground station 20. When it is determined that the connected base station is the ground station 30, the communication controller 553 executes the communication control such as the cell selection for the ground station 30 using the expressions for the ground station 30.

The measurement configuration is communication control measuring the radio wave intensity of a reception signal of the communication apparatus 50, for example. The measurement configuration for the non-ground station 20 is different from the measurement configuration for the ground station 30. The measurement configuration for the non-ground station 20 changes averaging processing on measured values for use in the measurement configuration for the ground station 30 in accordance with the type of the non-ground station 20, the altitude of the non-ground station 20, the moving speed of the non-ground station 20, the circling orbit of the non-ground station 20, or the like, for example. When being the low earth orbiting satellite or the medium earth orbiting satellite, for example, the non-ground station 20 moves at a high speed, and thus the measurement configuration for the non-ground station 20 performs the averaging processing on the measured values for use in the measurement configuration for the ground station 20 in a shorter time by switching the value of a forgetting coefficient, for example. The acquisition unit 551 acquires the measurement configuration for the ground station 30 or the measurement configuration for the non-ground station 20 from the connected base station.

When it is determined that the connected base station is the ground station 30, the communication controller 553 executes the communication control such as the measurement configuration for the ground station 30. When it is determined that the connected base station is the non-ground station 20, the communication controller 553 executes the communication control such as the measurement configuration for the non-ground station 20.

The RACH configuration is communication control of random access executed when the communication apparatus 50 establishes communication with the base station at the time of transmission, handover, or the like or performs resynchronization, for example. The RACH configuration for the non-ground station 20 is different from the RACH configuration for the ground station 30. The RACH configuration for the non-ground station 20 can be defined as being totally different from the RACH configuration for the ground station 30 or by adding correction information to the RACH configuration for the ground station 30. A cell range of the non-ground station 20 is wider than a cell range of the ground station 30 in accordance with the altitude of the non-ground station 20, for example. Moreover, the distance between the non-ground station 20 and the communication apparatus 50 is longer, and thus the RACH configuration for the non-ground station 20 sets a guard time to be longer than that of the RACH configuration for the ground station 30. The acquisition unit 551 acquires the RACH configuration for the ground station 30 or the RACH configuration for the non-ground station 20 from the connected base station.

The RACH configuration for the non-ground station 20 makes the number of preambles of random access larger than that of the RACH configuration for the ground station 30. The preamble is a signal that is first transmitted when the communication apparatus 50 executes random access. The communication apparatus 50 transmits the preamble randomly selected out of a plurality of preambles. The RACH configuration for the non-ground station 20 makes the number of preamble sequences of random access larger than that of the RACH configuration for the ground station 30. The preamble sequence is a sequence when the communication apparatus 50 first transmits the preamble when executing random access. The RACH configuration for the non-ground station 20 makes a power ramping step size of random access larger than that of the RACH configuration for the ground station 30. The power ramping step size is a step size of transmission power when transmission power is increased to resend the preamble when the communication apparatus 50 cannot receive the random response to the random access from the base station. The RACH configuration for the non-ground station 20 makes a window size of the random access response (a response window size) larger than that of the RACH configuration for the ground station 30. The window size of the random access response is a size when a monitoring period until when the communication apparatus 50 receives the random access response from the base station is adjusted.

Exemplified is a case in which the RACH configuration for the non-ground station 20 makes the power ramping step size of random access larger or makes the response window size of random access larger than that of the RACH configuration for the ground station 30. However, also assumed is a case in which the non-ground station 20, which is a drone or the like, has a narrower cell range than that of the ground station 30, for example. In this case, the RACH configuration for the non-ground station 20 may make the power ramping step size or the response window size smaller than that of the RACH configuration for the ground station 20; the mode can be changed as appropriate. Similarly, when the cell range of the non-ground station 20 is narrower, the RACH configuration for the non-ground station 20 may make the number of preambles or the number of preamble sequences of random access smaller than that of the RACH configuration for the ground station 20; the mode can be changed as appropriate.

Exemplified are cases in which, as the parameters within the RACH configuration, the number of preambles of random access, the power ramping step size of random access, and the response window size of random access are changed, for example. However, these parameters are not limiting; configuration information such as parameters such as a time-frequency resource of random access may be changed, for example; the mode can be changed as appropriate.

When it is determined that the connected base station is the ground station 30, the communication controller 553 executes the communication control such as the RACH configuration for the ground station 30. When it is determined that the connected base station is the non-ground station 20, the communication controller 553 executes the communication control such as the RACH configuration for the non-ground station 20.

The waveform is a waveform used when performing communication with the connected base station such as OFDM or peak-to-average power ratio (PAPR) characteristic, for example. The PAPR is an indicator indicating the magnitude of transmission power at the peak and is a ratio between maximum transmission power and average transmission power of a modulation signal. Reducing the PAPR can reduce the power consumption of the communication apparatus 50. The waveform for the non-ground station 20, for example, has a longer transmission distance, for example, and thus has a lower PAPR than the waveform for the ground station 30 and thus employs DFT-spread-OFDM (DFT-s-OFDM), for example. The waveform for the non-ground station 20 may switch the waveform in accordance with the transmission distance between the non-ground station 20 and the communication apparatus 50, the type of the non-ground station 20, a used frequency band, or the like; the mode can be changed as appropriate. The waveform for the non-ground station 20 is OFDM when the used frequency band is the Ka-Band and is DFT-s-OFDM or the like for the S-band, for example. The acquisition unit 551 acquires the waveform for the ground station 30 or the waveform for the non-ground station 20 from the connected base station.

In the waveform for the non-ground station 20, the number of subcarriers to be used reduces than that of conventional OFDM and may thus use index modulation, which achieves larger reception power than that of OFDM. The index modulation is the degree of modulation obtained by dividing a band by a modulated wave. Thus, the waveform for the non-ground station 20 may be the index modulation different from the waveform for the ground station 30.

When it is determined that the connected base station is the ground station 30, the communication controller 553 switches to the waveform for the ground station 30 to execute the communication control. When it is determined that the connected base station is the non-ground station 20, the communication controller 553 switches to the waveform for the non-ground station 20 to execute the communication control.

The multi-access system for the non-ground station 20 uses a multi-access system different from the multi-access system for the ground station 30 reducing inter-subcarrier interference such as filter bank multiple access (FBMC) having resistance to Doppler shift, for example. The acquisition unit 551 acquires the multi-access system for the ground station 30 or the multi-access system for the non-ground station 20 from the connected base station.

When it is determined that the connected base station is the ground station 30, the communication controller 553 switches to the multi-access system for the ground station 30 to execute the communication control. When it is determined that the connected base station is the non-ground station 20, the communication controller 553 switches to the multi-access system for the non-ground station 20 to execute the communication control.

The MCS is information obtained by indexing the modulation and coding scheme. When the communication apparatus 50 communicates with the non-ground station 20, it is assumed that the transmission distance between the non-ground station 20 and the communication apparatus 50 is long, and there is much transmission loss, for example. Given these circumstances, the MCS for the non-ground station 20 uses a lower low-order modulation scheme or employs the MCS using a lower code rate than the MCS for the ground station 30, for example. The acquisition unit 551 acquires the MCS for the ground station 30 or the MCS for the non-ground station 20 from the connected base station.

When it is determined that the connected base station is the ground station 30, the communication controller 553 switches to the MCS for the ground station 30 to execute the communication control. When it is determined that the connected base station is the non-ground station 20, the communication controller 553 switches to the MCS for the non-ground station 20 to execute the communication control.

The CQI is information obtained by indexing channel quality indicating a measurement result of reception quality. The CQI for the non-ground station 20 is the CQI different from the CQI for the ground station 30, for example. The acquisition unit 551 acquires the CQI for the ground station 30 or the CQI for the non-ground station 20 from the connected base station. When it is determined that the connected base station is the ground station 30, the communication controller 553 switches to the QCI for the ground station 30 to execute the communication control. When it is determined that the connected base station is the non-ground station, the communication controller 553 switches to the QCI for the non-ground station 20 to execute the communication control.

The communication controller 553 may prepare an MCS table and a CQI table for the ground station 30 and an MCS table and a CQI table for the non-ground station 20 and switch between the tables for the ground station 30 and the non-ground station 20 in accordance with the connected base station; the mode can be changed as appropriate.

The communication controller 553 prepares an MCS index and a CQI index for the ground station 30. The communication controller 553, when the connected base station is the non-ground station 20, may calculate an MCS/CQI index of the non-ground station 20 by a calculation of (MCS/CQI index−2) for the ground station 30; the mode can be changed as appropriate.

The HARQ is communication control using both the ARQ automatically resending data when an error occurs in a communication path and feedforward error correct (FEC) of error correction. When the communication apparatus 50 communicates with the non-ground station 20, it is assumed that the transmission delay between the non-ground station 20 and the communication apparatus 50 is large, and it takes time to transmit and receive the HARQ, for example. Given these circumstances, the HARQ for the non-ground station 20 employs a method that does not transmit the HARQ and increases the number of repetition to transmit HARQ-less, for example, in place of the HARQ for the ground station 30. The acquisition unit 551 acquires the HARQ for the ground station 30 or the HARQ for the non-ground station 20 from the connected base station.

When it is determined that the connected base station is the ground station 30, the communication controller 553 switches to the HARQ for the ground station 30 to execute the communication control. When it is determined that the connected base station is the non-ground station 20, the communication controller 553 switches to the HARQ for the non-ground station 20 to execute the communication control.

Transmission power control is communication control of transmission power of the communication apparatus 50. When the communication apparatus 50 communicates with the non-ground station 20, the moving speed of the non-ground station 20 is high, and the transmission distance between the non-ground station 20 and the communication apparatus 50 is long, for example, and thus it is assumed that a transmission delay is large. Given these circumstances, the transmission power control for the non-ground station 20 makes a step size of transmission electric energy larger than that of the transmission power control for the ground station 30, for example. The acquisition unit 551 acquires the transmission power control for the ground station 30 or the transmission power control for the non-ground station 20 from the connected base station.

When it is determined that the connected base station is the ground station 30, the communication controller 553 switches to the transmission power control for the ground station 30 to execute the communication control. When it is determined that the connected base station is the non-ground station 20, the communication controller 553 switches to the transmission power control for the non-ground station 20 to execute the communication control.

The tracking area is an area in which the communication apparatus 50 performs tracking. A tracking area list for the non-ground station 20 is different from a tracking area list for the ground station 30. When the non-ground station 20 is unmanned aircraft systems (UAS) such as the low earth orbiting satellite, the medium earth orbiting satellite, or the drone, the non-ground station 20 is moving even though the communication apparatus 50 is not moving, and thus, the tracking area for the non-ground station 20 is required to switch the tracking area. Thus, the tracking area list for the non-ground station 20, because it is assumed that the non-ground station 20 moves on a certain orbit, preferentially includes the non-ground station 20 on the orbit, for example. The acquisition unit 551 acquires the tracking area list for the ground station 30 or the tracking area list for the non-ground station 20 from the connected base station.

When it is determined that the connected base station is the ground station 30, the communication controller 553 switches to the tracking area list for the ground station 30 to execute the communication control. When it is determined that the connected base station is the non-ground station 20, the communication controller 553 switches to the tracking area list for the non-ground station 20 to execute the communication control.

The Sub-PRB is an assignment unit of a time-frequency resource in LTE, for example. When the communication apparatus 50 communicates with the non-ground station 20, the communication distance is longer than that of the ground station 30, and thus it is assumed that larger transmission power is required. Thus, the Sub-PRB for the non-ground station 20 is made smaller than the PRB size for the ground station 30 as means for ensuring transmission power. When the Sub-PRB for the ground station 30 is 1 PRB=12 subcarriers, the Sub-PRB for the non-ground station 20 is 1 PRB=6 subcarriers, for example. The acquisition unit 551 acquires the Sub-PRB for the ground station 30 or the Sub-PRB for the non-ground station 20 from the connected base station.

When it is determined that the connected base station is the ground station 30, the communication controller 553 switches to the Sub-PRB for the ground station 30 to execute the communication control. When it is determined that the connected base station is the non-ground station 20, the communication controller 553 switches to the Sub-PRB for the non-ground station 20 to execute the communication control.

[2-10. Switching Processing]

Figure 14:
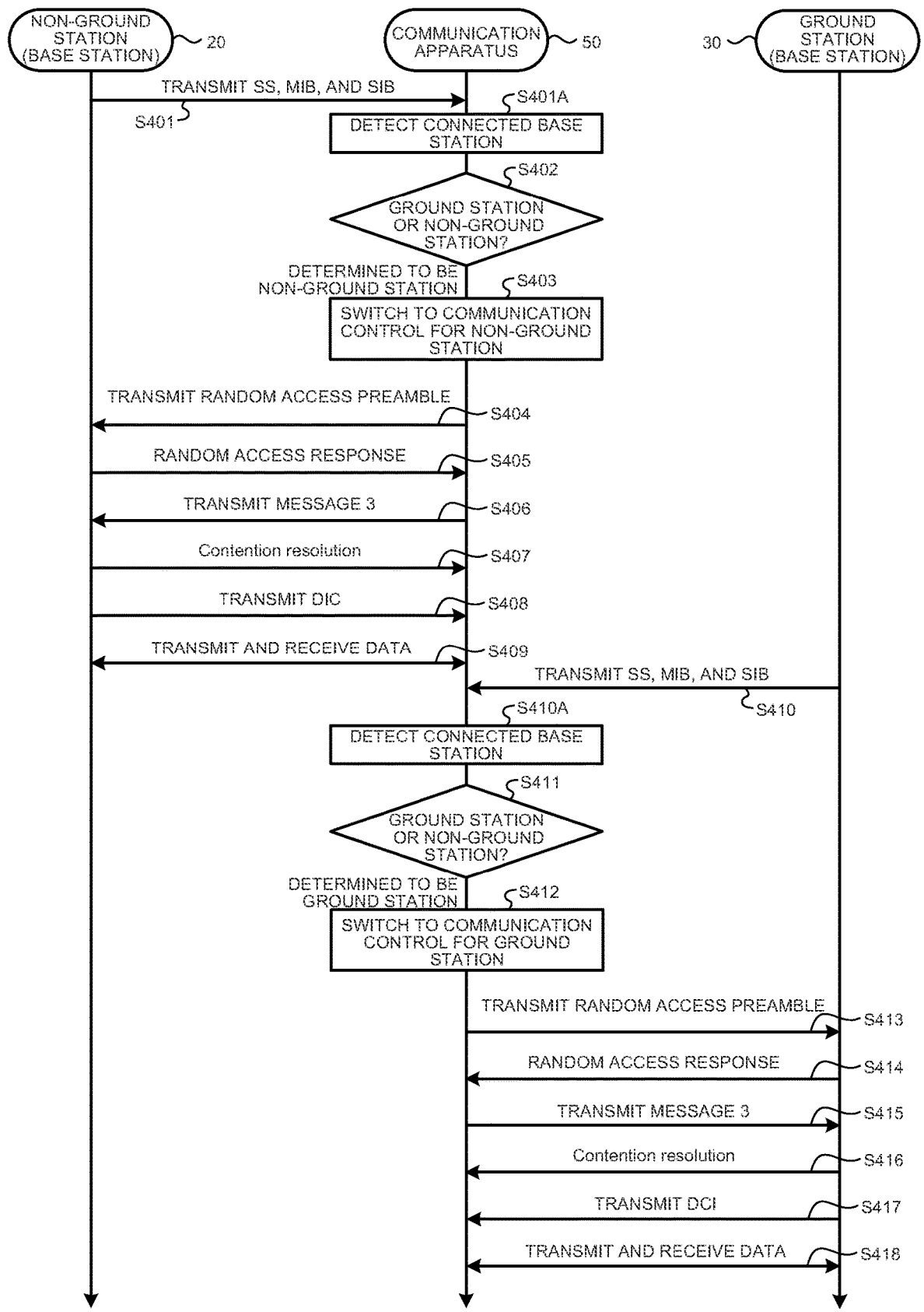
FIG. 14 is a sequence diagram of an exemplary operation according to switching processing by the communication apparatus.

FIG. 14 is a sequence diagram of an exemplary operation according to the switching processing by the communication apparatus 1. The switching processing is processing in which the communication apparatus 50 determines whether the connected base station is the ground station 30 or the non-ground station 20 and switches to the communication control corresponding to the connected base station.

When receiving the SS, the MIB, and the SIB from the base station (the non-ground station 20) in the idle state (Step S401), for example, the communication apparatus 50 detects the connected base station (Step S401A). The communication apparatus 50, when detecting the connected base station, determines whether the connected base station is the ground station 30 or the non-ground station 20 based on a used radio band of the connected base station (Step S402). The communication apparatus 50, because the used radio band of the connected base station is the used radio band of the non-ground station 20, for example, determines that the connected base station is the non-ground station 20.

When it is determined that the connected base station is the non-ground station 20, the communication apparatus 50 switches to the communication control for the non-ground station 20 based on the information acquired from the non-ground station 20 as the connected base station (Step S403). The communication apparatus 50 then transmits the random access preamble to the non-ground station 20 as the connected base station (Step S404).

The non-ground station 20, when receiving the random access preamble, transmits the random access response (Msg2) to the random access preamble to the communication apparatus 50 (Step S405). The communication apparatus 50, upon reception of the random access response, transmits the message (Msg3) to the random access response to the non-ground station 20 (Step S406). The non-ground station 20, upon reception of the message (Msg3), transmits the contention resolution message (Msg4: Contention Resolution) to the message (Msg3) to the communication apparatus 50 (Step S407). Furthermore, the non-ground station 20 transmits the DCI to the communication apparatus 50 (Step S408). The communication apparatus 50 starts radio communication with the non-ground station 20 based on the contention resolution message and the DCI (Step S409). The processing from Step S404 to Step S407 is the processing of the contention based random access procedure illustrated in FIG. 11, for example.

The communication apparatus 50, when receiving the SS, the MIB, and the SIB from the ground station 30 as another connected base station during communication with the non-ground station 20 (Step S410), detects the other connected base station (Step S410A). The communication apparatus 50, when detecting the other connected base station (Step S410A), determines whether the other connected base station is the ground station 30 or the non-ground station 20 based on the used radio band of the other connected base station (Step S411). The communication apparatus 50, because the used radio band of the other connected base station is the used radio band of the ground station 30, for example, determines that the other connected base station is the ground station 30.

The communication apparatus 50, when it is determined that the other connected base station is the ground station 30, switches to the communication control for the ground station 30 based on the information acquired from the ground station 30 as the connected base station (Step S412). The communication apparatus 50 then transmits the random access preamble to the ground station 30 as the other connected base station (Step S413).

The ground station 30, when receiving the random access preamble, transmits the random access response (Msg2) to the random access preamble to the communication apparatus 50 (Step S414). The communication apparatus 50, upon reception of the random access response, transmits the message (Msg3) to the random access response to the ground station 30 (Step S415). The ground station 30, upon reception of the message (Msg3), transmits the contention resolution message (Msg4: Contention Resolution) to the message (Msg3) to the communication apparatus 50 (Step S416). The processing from Step S413 to Step S416 is the processing of the contention based random access procedure illustrated in FIG. 11, for example. Furthermore, the ground station 30 transmits the DCI to the communication apparatus 50 (Step S417). The communication apparatus 50 starts radio communication with the ground station 30 based on the contention resolution message and the DCI (Step S418).

The communication apparatus 50 in the idle state detects the connected base station and, when it is determined that the connected base station is the non-ground station 20, switches to the communication control for the non-ground station 20. The communication apparatus 50 then switches to the communication control for the non-ground station 20 to establish radio communication with the non-ground station 20 through the random access procedure. Consequently, the communication apparatus 50 can achieve the communication control according to the non-ground station 20 as the connected base station.

The communication apparatus 50 detects a new connected base station during communication with the non-ground station 20 and, when it is determined that the new connected base station is the ground station 30, switches to the communication control for the ground station 30, for example. The communication apparatus 50 then switches to the communication control for the ground station 30 to establish radio communication with the ground station 30 through the random access procedure. Consequently, the communication apparatus 50 can achieve the communication control according to the ground station 30 as the new connected base station.

The switching processing illustrated in FIG. 14 exemplifies a case in which the communication apparatus 50, when detecting the SS, the MIB, and the SIB from the ground station 30 during communication with the non-ground station 20, determines that the connected base station is the ground station 30 and switches to the communication control for the ground station 30. However, the communication apparatus 50 in the idle state, when detecting the SS, the MIB, and the SIB from the ground station 30 as the new connected base station, determines that the connected base station is the ground station 30. The communication apparatus 50, when it is determined that the new connected base station is the ground station 30, may switch to the communication control for the ground station 30; the mode can be changed as appropriate.

The communication apparatus 50, when detecting the SS, the MIB, and the SIB from the non-ground station 20 as the new connected base station during communication with the ground station 30, may determine that the new connected base station is the non-ground station 20 and switch to the communication control for the non-ground station 20; the mode can be changed as appropriate.

The communication apparatus 50 can also achieve dual connectivity (DC), which connects to both the ground station 30 and the non-ground station 20 to enable simultaneous communication with them.

The non-ground station 20 may be the satellite station, the aircraft station, or the like. The communication apparatus 50, when detecting a new connected base station during communication with the satellite station, and when it is determined that the connected base station is the aircraft station, may switch to communication control for the aircraft station in place of communication control for the satellite station, for example; the mode can be changed as appropriate.

[2-11. Effects]

The communication apparatus 50 of the present embodiment acquires the information from the base station and determines whether the connected base station is the non-ground station 20 or the ground station 30 based on the acquired information. Furthermore, when it is determined that the connected base station is the non-ground station 20, the communication apparatus 50 executes the communication control for the non-ground station 20. Consequently, the communication apparatus 50 can execute the communication control in accordance with the connected base station.

When it is determined that the connected base station is the non-ground station 20, the communication apparatus 50 executes the communication control for the non-ground station 20 based on the information acquired from the connected base station. Consequently, the communication apparatus 50 can execute the communication control for the non-ground station 20 using the information acquired from the connected non-ground station 20.

The communication apparatus 50 acquires the SIB defined for the ground station 30 and the SIB defined for the non-ground station 20 from the connected base station. Furthermore, the communication apparatus 50 determines whether the connected base station is the non-ground station 20 or the ground station 30 based on the SIB. Consequently, the communication apparatus 50 can determine the connected base station using the SIB.

The SIB defined for the non-ground station 20 adds information for use in the communication control for the non-ground station 20 to the SIB defined for the ground station 30. Consequently, the communication apparatus 50 easily determines the connected base station using the SIB.

The communication apparatus 50 acquires the SS different in the subcarrier spacing between the ground station 30 and the non-ground station 20 from the connected base station and determines whether the connected base station is the non-ground station 20 or the ground station 30 based on the SS. Consequently, the communication apparatus 50 can determine the connected base station using the SS.

The communication apparatus 50 acquires the cell ID identifying the ground station 30 or the non-ground station 20 from the connected base station and determines whether the connected base station is the non-ground station 20 or the ground station 30 based on the cell ID. Consequently, the communication apparatus 50 can determine the connected base station using the cell ID.

The communication apparatus 50 determines whether the connected base station is the non-ground station 20 or the ground station 30 based on the used radio band of the connected base station. Consequently, the communication apparatus 50 can determine the connected base station using the used radio band.

The communication apparatus 50 acquires the information on the altitude at which the non-ground station 20 is positioned from the connected base station and, when it is determined that the connected base station is the non-ground station 20, executes the communication control for the non-ground station 20 based on the acquired information on the altitude of the non-ground station 20. Consequently, the communication apparatus 50 can execute the communication control for the non-ground station 20 using the information on the altitude of the non-ground station 20.

The communication apparatus 50 acquires the configuration information such as the flag, the RACH configuration, the measurement configuration, the communication format, the multi-access format, the MCS, the CQI, the HARQ, the transmission power control, and the Sub-PRB of the non-ground station 20 for use in the communication control for the non-ground station 20 from the connected base station. Furthermore, when it is determined that the connected base station is the non-ground station 20, the communication apparatus 50 executes the communication control for the non-ground station 20 based on the acquired configuration information. Consequently, the communication apparatus 50 can execute the communication control for the non-ground station 20 using the configuration information of the non-ground station 20.

The communication apparatus 50 acquires the number of preambles of the RACH for the non-ground station 20 different from the number of preambles of the RACH for the ground station 30 from the connected base station. When it is determined that the connected base station is the non-ground station 20, the communication apparatus 50 executes the communication control for the non-ground station 20 based on the acquired number of preambles of the RACH for the non-ground station 20. Consequently, the communication apparatus 50 can execute the communication control for the non-ground station 20 with the number of preambles of the RACH for the non-ground station 20.

The communication apparatus 50 acquires the number of sequences of the RACH for the non-ground station 20 different from the number of sequences of the RACH for the ground station 30 from the connected base station. When it is determined that the connected base station is the non-ground station 20, the communication apparatus 50 executes the communication control for the non-ground station 20 based on the acquired number of sequences of the RACH for the non-ground station 20. Consequently, the communication apparatus 50 can execute the communication control for the non-ground station 20 with the number of preamble sequences of the RACH for the non-ground station 20.

The communication apparatus 50 acquires a power ramping step amount controlling power related to preamble resending of the RACH for the non-ground station 20 different from a power ramping step amount controlling power related to preamble resending of the RACH for the ground station 30 from the connected base station. When it is determined that the connected base station is the non-ground station 20, the communication apparatus 50 executes the communication control for the non-ground station 20 based on the acquired power ramping step amount controlling power related to preamble resending of the RACH for the non-ground station 20. Consequently, the communication apparatus 50 can execute the communication control for the non-ground station 20 with the power ramping step amount of the RACH for the non-ground station 20.

The communication apparatus 50 acquires a window size monitoring a random access response to the RACH for the non-ground station 20 different from a window size monitoring a random access response to the RACH for the ground station 30 from the connected base station. When it is determined that the connected base station is the non-ground station 20, the communication apparatus 50 executes the communication control for the non-ground station 20 based on the acquired window size monitoring a random access response to the RACH for the non-ground station 20. Consequently, the communication apparatus 50 can execute the communication control for the non-ground station 20 with the window size monitoring a random access response to the RACH for the non-ground station 20.

The communication apparatus 50 acquires configuration information for use in the RACH for the non-ground station 20 different from configuration information for use in the RACH for the ground station 30 from the connected base station. When it is determined that the connected base station is the non-ground station 20, the communication apparatus 50 executes the communication control for the non-ground station 20 based on the acquired configuration information for the non-ground station 20. Consequently, the communication apparatus 50 can execute the communication control for the non-ground station 20 with the configuration information for use in the RACH for the non-ground station 20.

The communication apparatus 50 acquires the MCS for the non-ground station 20 different from the MCS for the ground station 30 from the connected base station. The communication apparatus 50 when it is determined that the connected base station is the non-ground station 20, executes the communication control for the non-ground station 20 based on the acquired MCS for the non-ground station. Consequently, the communication apparatus 50 can execute the communication control for the non-ground station 20 with the MCS for the non-ground station 20.

The communication apparatus 50 acquires the CQI for the non-ground station 20 different from the CQI for the ground station 30 from the connected base station. When it is determined that the connected base station is the non-ground station 20, the communication apparatus 50 executes the communication control for the non-ground station 20 based on the acquired CQI for the non-ground station 20. Consequently, the communication apparatus 50 can execute the communication control for the non-ground station 20 with the CQI for the non-ground station 20.

The communication apparatus 50 acquires a step amount controlling transmission power for the non-ground station 20 different from a step amount controlling transmission power for the ground station 30 from the connected base station. When it is determined that the connected base station is the non-ground station 20, the communication apparatus 50 executes the communication control for the non-ground station 20 based on the acquired step amount controlling the transmission power for the non-ground station 20. Consequently, the communication apparatus 50 can execute the communication control for the non-ground station 20 with the transmission power control for the non-ground station 20.

The communication apparatus 50 acquires the Sub-PRB for the non-ground station 20 different from the Sub-PRB for the ground station 30 from the connected base station. When it is determined that the connected base station is the non-ground station 20, the communication apparatus 50 executes the communication control for the non-ground station 20 based on the acquired Sub-PRB for the non-ground station 20. Consequently, the communication apparatus 50 can execute the communication control for the non-ground station 20 with the Sub-PRB for the non-ground station 20.

The communication apparatus 50 acquires moving speed information on a speed at which the non-ground station moves from the connected base station. When it is determined that the connected base station is the non-ground station 20, the communication apparatus 50 executes the communication control for the non-ground station 20 based on the acquired moving speed information for the non-ground station 20. Consequently, the communication apparatus 50 can execute the communication control for the non-ground station 20 using the moving speed information for the non-ground station 20.

The communication apparatus 50 acquires moving route information on a route through which the non-ground station 20 moves from the connected base station. When it is determined that the connected base station is the non-ground station 20, the communication apparatus 50 executes the communication control for the non-ground station 20 based on the acquired moving route information for the non-ground station 20. Consequently, the communication apparatus 50 can execute the communication control for the non-ground station 20 using the moving route information for the non-ground station 20.

The communication apparatus 50 acquires type information such as the GEO, the non-GEO, the MEO, the LEO, the drone, the airplane, or the balloon identifying the type of the non-ground station 20 from the connected base station. When it is determined that the connected base station is the non-ground station 20, the communication apparatus 50 executes the communication control for the non-ground station 20 based on the acquired type information for the non-ground station 20. Consequently, the communication apparatus 50 can execute the communication control for the non-ground station 20 using the type information for the non-ground station 20.

3. MODIFICATIONS

The embodiments described above each indicate an example, and various modifications and applications can be made.

[3-1. Modifications about System Configuration]

In the present embodiment, the non-ground station 20, the ground station 30, and the relay station 40 support cellular communication systems such as W-CDMA, cdma2000, LTE, and NR. However, the cellular communication systems supported by the non-ground station 20, the ground station 30, and the relay station 40 are not limited to the cellular communication systems; these apparatuses may support other cellular communication systems such as Ultra-Mobile Broadband (UMB). In addition, these apparatuses may support other radio communication systems such as short distance radio communication systems, proximity radio communication systems, and radio local area network (LAN) systems apart from the cellular communication systems.

In the embodiment described above, the non-ground stations 20 form the low earth orbiting satellite constellation; the satellite constellation formed by the non-ground stations 20 is not limited to the low earth orbiting satellite constellation. The satellite constellation formed by the non-ground stations 20 may be a satellite constellation such as a medium earth orbiting satellite constellation or a geostationary earth orbiting satellite constellation.

In the embodiment described above, a single base station forms a single cell, for example. However, a plurality of base stations may form a single cell in cooperation with each other; the mode can be changed as appropriate.

(I) The trigger information is information used by the communication apparatus 50 for determining whether the connected base station is switched. The trigger information is information used by the communication apparatus 50 for determining whether the connected base station is switched using information on reception power (the RSRP or the RSRQ, for example), for example. The trigger information may be a determination threshold (a first trigger value) about a measured value of power received from the connected base station (the RSRP, the RSRQ, or the like) or a difference value between two measured values of power (a second trigger value), for example.

The trigger information is not limited to the information for use in performing switching determination using the information on reception power (the first trigger value or the second trigger value, for example). The trigger information may be movement information of an apparatus related to connection switching, for example. In this case, the movement information is information including at least one piece of information among the current position, the moving direction, and the moving speed of the apparatus related to connection switching, for example. The apparatus related to connection switching is at least one apparatus among the communication apparatus 50, the connected base station, and the switching candidate base station, for example.

First, the communication apparatus 50 determines whether the communication apparatus 50 is present within a certain distance of an end of a cell (hereinafter, referred to simply as a cell end) formed by the connected base station based on the movement information of the communication apparatus 50 itself and/or the movement information of the base station being connected to the communication apparatus 50. In this process, the movement information may be information on the current position of the communication apparatus 50 and the connected base station. When the communication apparatus 50 is present within the certain distance of the cell end, the communication apparatus 50 determines that the current point in time is the switching timing of the base station. The communication apparatus 50 then executes processing to switch the connected base station (handover processing, for example). Determination of the switching timing of the connected base station may be based on prediction. The communication apparatus 50 predicts a time until the communication apparatus 50 reaches the cell end based on the movement information of the communication apparatus 50 itself and/or the movement information of the base station being connected to the communication apparatus 50, for example. In this process, the movement information may include information on the current position, the moving direction, and the moving speed of the communication apparatus 50 and the connected base station. When the communication apparatus 50 and the connected base station are regularly moving, the movement information may include information on the moving route of the communication apparatus 50 and the connected base station. When the predicted time is shorter than a certain time, the communication apparatus 50 determines that the current point in time is the switching timing of connection. The communication apparatus 50 then executes the processing to switch the connected base station (the handover processing, for example).

Determination of the switching timing of the connected base station may be based on the movement information of the switching candidate base station. The non-ground station 20 determines whether the communication apparatus 50 has been within the cell formed by the switching candidate base station based on the movement information of the switching candidate base station, for example. When the communication apparatus 50 is within the cell, the non-ground station 20 determines that the current point in time is the switching timing of the connected base station. The communication apparatus 50 then executes the processing to switch the connected base station (the handover processing, for example).

The trigger information is contained in the switching information, whereby it is easy for the apparatus on the radio network (the management apparatus 10, the non-ground station 20, or the like) to manage the switching timing of the base station of the communication apparatus 50. For the communication apparatus 50 also, the base station can be switched with optimum timing suitable for occasions.

The switching information acquired by the communication apparatus 50 may include the switching information (the resource information, for example) of the base station further assumed to be a switching candidate after being connected to the switching candidate base station in addition to the switching information of the switching candidate base station. The communication apparatus 50 acquires first switching information for use in connection switching to a first base station (the next base station) to be a switching candidate from the connected base station, for example. At the same time, the communication apparatus 50 may also acquire second switching information for use in connection switching to a second base station (the next base station but one) to be a switching candidate after being connected to the first base station from the connected base station. The switching information may include third switching information for use in connection switching to a third base station (the next base station but two) to be further a switching candidate after being connected to the second base station. The switching information may include the resource information for connecting to the next base station but two or more.

In this case, the base station being connected to the communication apparatus 50 may determine base stations to be the first base station, the second base station, and the third base station out of a plurality of base stations based on the movement information of the other base stations. It is understood that the base station may determine the next base station but two or more.

Not only the switching information for use in the next switching, but also further later switching information is acquired in advance, whereby the communication apparatus 50 can smoothly switch connection even when switching occurs frequently at short time intervals. Consequently, the communication apparatus 50 can maintain high communication quality.

[3-2. Other Modifications]

A control apparatus controlling the management apparatus 10, the non-ground station 20, the ground station 30, the relay station 40, or the communication apparatus 50 of the present embodiment may be implemented by an exclusive computer system or a general-purpose computer system.

A communication program for executing the operations described above (the initial connection processing and the switching processing, for example) is stored and distributed in a computer-readable recording medium such as an optical disc, a semiconductor memory, a magnetic tape, or a flexible disk, for example. The computer program is installed in a computer, and the processing described above is executed to form the control apparatus, for example. In this process, the control apparatus may be an apparatus outside the management apparatus 10, the non-ground station 20, the ground station 30, the relay station 40, or the communication apparatus 50 (a personal computer, for example). The control apparatus may be an apparatus inside the non-ground station 20, the ground station 30, the relay station 40, or the communication apparatus 50 (the controller 13, the controller 23, the controller 34, the controller 44, or the controller 55, for example).

The communication program may be stored in a disk apparatus included in a server apparatus on a network such as the Internet and downloaded or the like to a computer. The function described above may be implemented by cooperation between an operating system (OS) and application software. In this case, the part other than the OS may be stored and distributed in a medium, or the part other the OS may be stored in the server apparatus and download or the like to a computer.

Among the pieces of processing described in the embodiment, the whole or part of the processing described as being automatically performed can also be performed manually; alternatively, the whole or part of the processing described as being manually performed can also be performed automatically by a known method. The processing procedure, the specific names, and the information including the various kinds of data and parameters shown in the specification and the drawings can be freely changed except specially mentioned cases. The various kinds of information illustrated in the drawings is not limited to the illustrated information, for example.

The components of the illustrated apparatuses are functionally conceptual ones and are not necessarily required to be physically configured as illustrated. That is to say, the specific modes of distribution and integration of the apparatuses are not limited to the illustrated ones; the whole or part thereof can be configured with any units functionally or physically distributed or integrated in accordance with various kinds of loads and use conditions.

The embodiments described above can be combined with each other as appropriate in an area in which processing details are not contradictory to each other. The orders of the steps illustrated in the flowcharts or sequence diagrams of the embodiments described above can be changed as appropriate.

4. CONCLUSION

As described in the foregoing, according to an embodiment of the present disclosure, the communication apparatus 50 determines whether the connected base station is the non-ground station 20 or the ground station 30 and, when it is determined that the connected base station is the non-ground station 20, executes the communication control for the non-ground station 20. Consequently, regardless whether the connected base station is the ground station 30 or the non-ground station 20, the communication control suitable for the connected ground station can be achieved.

The embodiments of the present disclosure have been described; the technical scope of the present disclosure is not limited to the embodiments described above as they are, and various modifications can be made within the scope not departing from the gist of the present disclosure. The components across the different embodiments and modifications can be combined with each other as appropriate.

The effects in the embodiments described in the present specification are only by way of example and are not limiting; there may be other effects.

The present technique can also take the following configurations.

(1)

A communication apparatus comprising:
an acquisition unit acquiring information from a base station apparatus;
a determination unit determining whether a connected base station apparatus is a non-ground station or a ground station based on the acquired information; and
a communication controller executing communication control for the non-ground station when it is determined that the connected base station apparatus is the non-ground station.

(2)

The communication apparatus according to (1), wherein the communication controller executes the communication control for the non-ground station based on information acquired from the connected base station apparatus by the acquisition unit when it is determined that the connected base station apparatus is the non-ground station.

(3)

The communication apparatus according to (1) or (2), wherein
the acquisition unit acquires system information defined for the ground station and system information defined for the non-ground station from the connected base station apparatus, and
the determination unit determines whether the connected base station apparatus is the non-ground station or the ground station based on the system information.

(4)

The communication apparatus according to (3), wherein the system information defined for the non-ground station is information obtained by adding information for use in the communication control for the non-ground station to the system information defined for the ground station.

(5)

The communication apparatus according to any one of (1) to (4), wherein
the acquisition unit acquires number of preambles of random access for the non-ground station different from number of preambles of random access for the ground station from the connected base station apparatus, and
the communication controller executes the communication control for the non-ground station based on the acquired number of preambles of random access for the non-ground station when it is determined that the connected base station apparatus is the non-ground station.

(6)

The communication apparatus according to any one of (1) to (5), wherein the acquisition unit acquires number of sequences of random access for the non-ground station different from number of sequences of random access for the ground station from the connected base station apparatus, and the communication controller executes the communication control for the non-ground station based on the acquired number of sequences of random access for the non-ground station when it is determined that the connected base station apparatus is the non-ground station.

(7)

The communication apparatus according to any one of (1) to (6), wherein the acquisition unit acquires a step amount controlling power related to preamble resending of random access for the non-ground station different from a step amount controlling power related to preamble resending of random access for the ground station from the connected base station apparatus, and the communication controller executes the communication control for the non-ground station based on the acquired step amount controlling power related to preamble resending of random access for the non-ground station when it is determined that the connected base station apparatus is the non-ground station.

(8)

The communication apparatus according to any one of (1) to (7), wherein the acquisition unit acquires a window size monitoring a response to random access for the non-ground station different from a window size monitoring a response to random access for the ground station from the connected base station apparatus, and the communication controller executes the communication control for the non-ground station based on the acquired window size monitoring a response to random access for the non-ground station when it is determined that the connected base station apparatus is the non-ground station.

(9)

The communication apparatus according to any one of (1) to (8), wherein the acquisition unit acquires configuration information for use in random access for the non-ground station different from configuration information for use in random access for the ground station from the connected base station apparatus, and the communication controller executes the communication control for the non-ground station based on the acquired configuration information for the non-ground station when it is determined that the connected base station apparatus is the non-ground station.

(10)

The communication apparatus according to any one of (1) to (9), wherein the acquisition unit acquires number of subcarriers per physical resource block for the non-ground station different from number of subcarriers per physical resource block for the ground station from the connected base station apparatus, and the communication controller executes the communication control for the non-ground station based on the acquired number of subcarriers per physical resource block for the non-ground station when it is determined that the connected base station apparatus is the non-ground station.

(11)

The communication apparatus according to any one of (1) to (10), wherein the acquisition unit acquires a synchronization signal different in a subcarrier spacing between the ground station and the non-ground station from the connected base station apparatus, and the determination unit determines whether the connected base station apparatus is the non-ground station or the ground station based on the synchronization signal.

(12)

The communication apparatus according to any one of (1) to (11), wherein the acquisition unit acquires identification information identifying the ground station or the non-ground station from the connected base station apparatus, and the determination unit determines whether the connected base station apparatus is the non-ground station or the ground station based on the identification information.

(13)

The communication apparatus according to any one of (1) to (12), wherein the acquisition unit acquires information on an altitude at which the non-ground station is positioned from the connected base station apparatus, and the communication controller executes the communication control for the non-ground station based on the acquired information on the altitude of the non-ground station when it is determined that the connected base station apparatus is the non-ground station.

(14)

The communication apparatus according to any one of (1) to (13), wherein the acquisition unit acquires configuration information for use in the communication control for the non-ground station from the connected base station apparatus, and the communication controller executes the communication control for the non-ground station based on the acquired configuration information when it is determined that the connected base station apparatus is the non-ground station.

(15)

The communication apparatus according to any one of (1) to (14), wherein the acquisition unit acquires a modulation and coding scheme for the non-ground station different from a modulation and coding scheme for the ground station from the connected base station apparatus, and the communication controller executes the communication control for the non-ground station based on the acquired modulation and coding scheme for the non-ground station when it is determined that the connected base station apparatus is the non-ground station.

(16)

The communication apparatus according to any one of (1) to (15), wherein the acquisition unit acquires a channel quality indicator for the non-ground station different from a channel quality indicator for the ground station from the connected base station apparatus, and the communication controller executes the communication control for the non-ground station based on the acquired channel quality indicator for the non-ground station when it is determined that the connected base station apparatus is the non-ground station.

(17)

The communication apparatus according to any one of (1) to (16), wherein the acquisition unit acquires a step amount controlling transmission power for the non-ground station different from a step amount controlling transmission power for the ground station from the connected base station apparatus, and the communication controller executes the communication control for the non-ground station based on the acquired step amount controlling the transmission power for the non-ground station when it is determined that the connected base station apparatus is the non-ground station.

(18)

The communication apparatus according to any one of (1) to (17), wherein the determination unit determines whether the connected base station apparatus is the non-ground station or the ground station based on a used radio band of the connected base station apparatus.

(19)

The communication apparatus according to any one of (1) to (18), wherein the acquisition unit acquires moving speed information on a speed at which the non-ground station moves from the connected base station apparatus, and the communication controller executes the communication control for the non-ground station based on the acquired moving speed information of the non-ground station when it is determined that the connected base station apparatus is the non-ground station.

(20)

The communication apparatus according to any one of (1) to (19), wherein the acquisition unit acquires moving route information on a route through which the non-ground station moves from the connected base station apparatus, and the communication controller executes the communication control for the non-ground station based on the acquired moving route information of the non-ground station when it is determined that the connected base station apparatus is the non-ground station.

(21)

The communication apparatus according to any one of (1) to (20), wherein the acquisition unit acquires type information identifying a type of the non-ground station from the connected base station apparatus, and the communication controller executes the communication control for the non-ground station based on the acquired type information of the non-ground station when it is determined that the connected base station apparatus is the non-ground station.

(22)

A method of communication by which a communication apparatus:

acquires information from a base station apparatus;

determines whether a connected base station apparatus is a non-ground station or a ground station based on the acquired information; and executes communication control for the non-ground station when it is determined that the connected base station apparatus is the non-ground station.

(23)

A communication program causing a computer included in a communication apparatus to function as:

an acquisition unit acquiring information from a base station apparatus;

a determination unit determining whether a connected base station apparatus is a non-ground station or a ground station based on the acquired information; and a communication controller executing communication control for the non-ground station when it is determined that the connected base station apparatus is the non-ground station.

REFERENCE SIGNS LIST

20 NON-GROUND STATION
30 GROUND STATION
50 COMMUNICATION APPARATUS
55 CONTROLLER
551 ACQUISITION UNIT
552 DETERMINATION UNIT
553 COMMUNICATION CONTROLLER

The invention claimed is:

1. A communication method, comprising:
in a non-ground base station:
transmitting first information and second information, wherein
the first information includes information regarding a capability of connectivity to the non-ground base station, and
the second information includes at least one of a moving speed of the non-ground base station, a circling orbit of the non-ground base station, or a moving route of the non-ground base station;
transmitting a step amount controlling power related to preamble resending of random access to a communication apparatus; and
communicating with the communication apparatus, based on the transmitted step amount controlling the power related to the preamble resending of the random access.

2. The communication method according to claim 1, further comprising
transmitting system information defined for the non-ground base station to the communication apparatus.

3. The communication method according to claim 2, wherein the system information defined for the non-ground base station is information obtained by adding information for communicating with the non-ground base station to system information defined for a ground base station.

4. The communication method according to claim 1, further comprising:
transmitting a number of preambles of the random access to the communication apparatus; and
communicating with the communication apparatus based on the transmitted number of preambles of the random access.

5. The communication method according to claim 1, further comprising:
transmitting a number of sequences of the random access to the communication apparatus; and
communicating with the communication apparatus based on the transmitted number of sequences of the random access.

6. The communication method according to claim 1, further comprising:
  transmitting a window size monitoring a response to the random access to the communication apparatus; and
  communicating with the communication apparatus based on the transmitted window size monitoring the response to the random access.

7. The communication method according to claim 1, further comprising:
  transmitting configuration information for use in the random access to the communication apparatus; and
  communicating with the communication apparatus based on the transmitted configuration information.

8. The communication method according to claim 1, further comprising:
  transmitting a number of subcarriers per physical resource block to the communication apparatus; and
  communicating with the communication apparatus based on the transmitted number of subcarriers per physical resource block.

9. The communication method according to claim 1, further comprising
  transmitting a synchronization signal to the communication apparatus.

10. The communication method according to claim 1, further comprising
  transmitting identification information to the communication apparatus.

11. The communication method according to claim 1, further comprising:
  transmitting information on an altitude of the non-ground base station to the communication apparatus; and
  communicating with the communication apparatus based on the transmitted information on the altitude of the non-ground base station.

12. The communication method according to claim 1, further comprising:
  transmitting configuration information to the communication apparatus; and
  communicating with the communication apparatus based on the transmitted configuration information.

13. The communication method according to claim 1, further comprising:
  transmitting a modulation and coding scheme to the communication apparatus; and
  communicating with the communication apparatus based on the transmitted modulation and coding scheme.

14. The communication method according to claim 1, further comprising:
  transmitting a channel quality indicator to the communication apparatus; and
  communicating with the communication apparatus based on the transmitted channel quality indicator.

15. The communication method according to claim 1, further comprising:
  transmitting a step amount controlling transmission power to the communication apparatus; and
  communicating with the communication apparatus based on the transmitted step amount controlling the transmission power.

16. The communication method according to claim 1, further comprising:
  transmitting moving speed information on the moving speed of the non-ground base station to the communication apparatus; and
  communicating with the communication apparatus based on the transmitted moving speed information.

17. The communication method according to claim 1, further comprising:
  transmitting moving route information on the moving route, through which the non-ground base station moves, to the communication apparatus; and
  communicating with the communication apparatus based on the transmitted moving route information.

18. The communication method according to claim 1, further comprising:
  transmitting type information identifying a type of the non-ground base station to the communication apparatus; and
  communicating with the communication apparatus based on the transmitted type information.

19. A non-ground base station, comprising:
  circuitry configured to:
    transmit first information and second information, wherein
      the first information includes information regarding a capability of connectivity to the non-ground base station, and
      the second information includes at least one of a moving speed of the non-ground base station, a circling orbit of the non-ground base station, or a moving route of the non-ground base station;
    transmit a step amount controlling power related to preamble resending of random access to a communication apparatus; and
    communicate with the communication apparatus, based on the transmitted step amount controlling the power related to the preamble resending of the random access.

20. A non-transitory computer-readable medium having stored thereon computer-executable instructions that, when executed by a processor, cause the processor to execute operations, the operations comprising:
  transmitting first information and second information from a non-ground base station, wherein
    the first information includes information regarding a capability of connectivity to the non-ground base station, and
    the second information includes at least one of a moving speed of the non-ground base station, a circling orbit of the non-ground base station, or a moving route of the non-ground base station;
  transmitting a step amount controlling power related to preamble resending of random access to a communication apparatus; and
  communicating with the communication apparatus, based on the transmitted step amount controlling the power related to the preamble resending of the random access.

* * * * *